| (12) | United States Patent | (10) Patent No.: | US 9,986,112 B2 |
|---|---|---|---|
| | Yamaguchi | (45) Date of Patent: | May 29, 2018 |

(54) IMAGE DISPLAY CONTROL DEVICE AND IMAGE FORMING APPARATUS INCLUDING THE SAME

(71) Applicant: Sharp Kabushiki Kaisha, Osaka-shi, Osaka (JP)

(72) Inventor: Takeshi Yamaguchi, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 313 days.

(21) Appl. No.: 14/730,411

(22) Filed: Jun. 4, 2015

(65) Prior Publication Data

US 2015/0271350 A1 Sep. 24, 2015

Related U.S. Application Data

(63) Continuation of application No. 13/242,357, filed on Sep. 23, 2011.

(30) Foreign Application Priority Data

Sep. 27, 2010 (JP) ................................. 2010-215719

(51) Int. Cl.
*H04N 1/00* (2006.01)
*G03G 15/00* (2006.01)

(52) U.S. Cl.
CPC ....... *H04N 1/00448* (2013.01); *G03G 15/502* (2013.01); *G03G 15/5087* (2013.01); *H04N 1/0045* (2013.01); *H04N 1/00411* (2013.01); *H04N 1/00458* (2013.01); *H04N 1/00474* (2013.01); *H04N 1/00482* (2013.01); *G03G 2215/00109* (2013.01); *H04N 2201/0094* (2013.01)

(58) Field of Classification Search
None
See application file for complete search history.

(56) References Cited

U.S. PATENT DOCUMENTS 5,774,233 A * 6/1998 Sakamoto ................. G06F 1/16
345/649
6,473,539 B1 * 10/2002 Koga ................. G03G 15/6544
382/292
6,498,658 B1 * 12/2002 Sekikawa .......... H04N 1/00384
358/1.1

(Continued)

OTHER PUBLICATIONS

Yamaguchi, "Image Display Control Device and Image Forming Apparatus Including the Same", U.S. Appl. No. 13/242,357, filed Sep. 23, 2011.

*Primary Examiner* — Hilina K Demeter

(74) *Attorney, Agent, or Firm* — Keating & Bennett, LLP

(57) ABSTRACT

A control unit includes a touch panel display capable of presenting preview display of multiple pages of document images in a scrollable manner on the display panel. The touch panel display controller includes: a commanded position detecting controller that detects a commanded position relative to one of document images being a reference in the preview image displayed on a display panel; a preview layout direction switching controller that switches the layout direction in the preview image in accordance with the commanded position; and a scroll direction switching controller that switches the scrolling direction in the preview image in accordance with the detected commanded position.

7 Claims, 22 Drawing Sheets

(56) References Cited

U.S. PATENT DOCUMENTS

| | | | |
|---|---|---|---|
| 8,203,722 B2* | 6/2012 | Yano | H04N 1/00411 358/1.12 |
| 2005/0174589 A1* | 8/2005 | Tokiwa | G06T 11/60 358/1.9 |
| 2006/0224559 A1* | 10/2006 | Abiko | H04N 1/32609 |
| 2007/0139741 A1* | 6/2007 | Takami | H04N 1/00413 358/527 |
| 2007/0157084 A1* | 7/2007 | Yano | H04N 1/00421 715/234 |
| 2007/0216973 A1* | 9/2007 | Tagawa | G03G 15/6541 358/527 |
| 2008/0225346 A1* | 9/2008 | Mano | H04N 1/40 358/448 |
| 2008/0309956 A1* | 12/2008 | Yano | H04N 1/00411 358/1.9 |
| 2009/0103123 A1* | 4/2009 | Ikedo | B41J 3/4075 358/1.12 |
| 2009/0153903 A1* | 6/2009 | Kunii | H04N 1/0035 358/1.16 |
| 2009/0237728 A1* | 9/2009 | Yamamoto | G06F 3/1454 358/1.15 |
| 2010/0007915 A1* | 1/2010 | Ogino | H04N 1/0044 358/1.15 |
| 2010/0188679 A1* | 7/2010 | Nakagawa | H04N 1/0035 358/1.12 |
| 2010/0259641 A1* | 10/2010 | Fujimoto | G11B 27/105 348/231.3 |
| 2010/0328739 A1* | 12/2010 | Saida | H04N 1/00448 358/498 |

* cited by examiner

IMAGE DISPLAY CONTROL DEVICE AND IMAGE FORMING APPARATUS INCLUDING THE SAME

This Nonprovisional application claims priority under 35 U.S.C. § 119(a) on Patent Application No. 2010-215719 filed in Japan on 27 Sep. 2010, the entire contents of which are hereby incorporated by reference.

BACKGROUND OF THE INVENTION (1) Field of the Invention

The present invention relates to an image display control device for use in an electrophotographic image forming apparatus such a copier, printer, facsimile machine or the like and an image forming apparatus including the control device, in particular, relating to an image display control device capable of displaying plural pages of document images in a preview representation as well as to an image forming apparatus including the same.

(2) Description of the Prior Art

Conventionally, in a case of documentation using a word processor, there have been configurations in which pages of document images are always laid out and displayed vertically without regard to the settings of, for example, "binding margins" and "binding positions" in printout when "print layout" mode or "reading layout" mode is selected.

There are some software programs for displaying image data, in which when "two-page spread" is selected as a page display mode, pairs of facing pages each arranged abreast in the spread layout and vertically lined are displayed.

As the prior art, there is a disclosure of technology for integrally duplicating scanned document image data, in which the document image data is displayed on a touch panel and when a page break is inserted, the page break is specified in the image data, using lateral layout (lateral scroll) in a display of document image data (see Patent Document 1).

Patent Document 1

Japanese Patent Application Laid-open 2006-166220

It is possible for the above prior art technology to move a particular document page and/or insert a new document page in the preview display in which a plurality of document pages are laid out. It is, however, impossible to change the layout direction in the preview display and the direction of scrolling, in association with move and/or insertion of document pages.

SUMMARY OF THE INVENTION

The present invention has been devised in view of the above prior art problems, it is therefore an object of the present invention to provide an image display control device and an image forming apparatus using the same, with which it is possible to change the layout direction in the preview display and the direction of scrolling in association with move and/or insertion of document pages.

The first aspect of the invention resides in an image display control device comprising:

a control screen displaying document images in preview representation; and, a display controller, characterized in that the display controller has the function of presenting plural pages of document images on the control screen in preview representation and the function of displaying the plural pages of document images presented in preview representation in a vertically or laterally scrolling manner, the display controller includes:

a commanded position detecting controller that detects a commanded position relative to a reference document image to be the reference among multiple pages of document images in the preview image displayed on the control screen when the user designates a position to be operated on the control screen;

a preview layout direction switching controller that switches the layout direction (the lineup direction of document images) in the preview image in accordance with the commanded position detected by the commanded position detecting controller; and, a scroll direction switching controller that switches the scrolling direction in the preview image in accordance with the detected commanded position detected by the commanded position detecting controller.

The second aspect of the present invention resides in that the display controller includes a document image insertion controller that inserts a new document image into the commanded position detected by the commanded position detecting controller, the preview layout direction switching controller includes a first preview layout direction setting function of setting the preview layout direction so as to be directed along the direction in which the reference document image and the new document image inserted by the document image insertion controller are laid out, and, the scroll direction switching controller includes a first scroll direction setting function of setting the scrolling direction so as to be directed along the direction in which the reference document image and the newly document image inserted by the document image insertion controller are laid out.

The third aspect of the present invention resides in that the display controller includes a document image movement controller that moves a document image, displayed at the commanded position detected by the commanded position detecting controller, and selected from the multiple pages of document images, the preview layout direction switching controller includes a second preview layout direction setting function of setting the preview layout direction so as to be directed along the direction in which the reference document image and the document image moved by the document image movement controller are laid out, and, the scroll direction switching controller includes a second scroll direction setting function of setting the scrolling direction so as to be directed along the direction in which the reference document image and the document image moved by the document image movement controller are laid out.

The fourth aspect of the present invention resides in that the preview layout direction switching controller includes a third preview layout direction setting function of setting the preview layout direction so as to be directed along the direction from the reference document image toward the detected commanded position detected by the commanded position detecting controller, and, the scroll direction switching controller includes a third scroll direction setting function of setting the scrolling direction so as to be directed from the reference document image toward the commanded position detected by the commanded position detecting controller.

The fifth aspect of the present invention resides in that when the commanded position detecting controller detects the commanded position at the upper or lower side of the reference document image, the preview layout direction switching controller sets the layout direction in the preview image so as to be directed in the vertical direction (the top-and-bottom direction) on the control screen, and, the scroll direction switching controller sets the scrolling direction in the preview image so as to be directed in the vertical direction (the top-and-bottom direction) on the control screen.

The sixth aspect of the present invention resides in that when the commanded position detecting controller detects the commanded position at the left or right side of the reference document image, the preview layout direction switching controller sets the layout direction in the preview image so as to be directed in the lateral direction (the left-and-right direction) on the control screen, and, the scroll direction switching controller sets the scrolling direction in the preview image so as to be directed in the lateral direction (the left-and-right direction) on the control screen.

The seventh aspect of the present invention resides in that the display controller includes:

a finishing process setup controller that sets up a finishing process (stapling, punching and/or page allocation etc.);

a finished state display controller that displays the finished state of document images, i.e., the state in which the post-processing has been completed after printing in preview representation; and, a finishing process setup modification controller that changes a binding position designated at the finishing process, in accordance with the commanded position detected by the commanded position detecting controller.

The eighth aspect of the present invention resides in that the finishing process setup modification controller includes a function of modifying the binding position designated in the finishing process, in accordance with the commanded position into which the newly inserted document image is inserted, detected by the commanded position detecting controller.

The ninth aspect of the present invention resides in that the finishing process setup modification controller includes a function of modifying the binding position designated in the finishing process, in accordance with the commanded position, to which the document image selected from the displayed multiple pages of document images is moved, detected by the commanded position detecting controller.

The tenth aspect of the present invention resides in that the preview layout direction selecting controller is configured to be able to select the direction of arrangement of document images in the preview image on the control screen, either from right to left or left to right, when the controller switches the layout direction in the preview image on the control screen, from the vertical direction to the lateral direction, in accordance with the detected commanded position.

The eleventh aspect of the present invention resides in an image forming apparatus including an image display control device, in which any of the above first to tenth aspects is used as the image display control device.

According to the first aspect of the present invention, it is possible to easily change the layout direction and scrolling direction in the preview image in accordance with the position the user designates, in moving a document page or inserting a new document page when the user checks and edits the preview image.

According to the second aspect of the present invention, it is possible to easily change the layout direction and scrolling direction in the preview image in accordance with the position the user designates.

According to the third aspect of the present invention, it is possible to easily change the layout direction and scrolling direction in the preview image in accordance with the position the user designates.

According to the fourth aspect of the present invention, it is possible to easily change the layout direction and scrolling direction in the preview image in accordance with the position the user designates.

According to the fifth aspect of the present invention, it is possible to easily change the layout direction and scrolling direction in the preview image in accordance with the position the user designates.

According to the sixth aspect of the present invention, it is possible to easily change the layout direction and scrolling direction in the preview image in accordance with the position the user designates.

According to the seventh aspect of the present invention, it is possible to easily change settings for the finished state such as stapling, punching and/or page allocation etc., as well as changing the layout direction and scrolling direction in the preview image of the finished document state in moving a document image or inserting a document page in accordance with the position the user designates when the user checks and edits the preview image.

According to the eighth aspect of the present invention, it is possible to easily change the settings for a finishing process such as stapling, punching and/or page allocation etc., as well as changing the layout direction and scrolling direction in the preview image, in accordance with the position the user designates.

According to the ninth aspect of the present invention, it is possible to easily change the binding position as well as changing the layout direction and scrolling direction in the preview image, in accordance with the position the user designates.

According to the tenth aspect of the present invention, it is possible to easily change the binding position as well as changing the layout direction and scrolling direction in the preview image, in accordance with the position the user designates.

According to the eleventh aspect of the present invention, it is possible to easily change the layout direction and scrolling direction in the preview image in accordance with the position the user designates, in moving a document page or inserting a new document page when the user checks and edits the preview image.

DESCRIPTION OF THE PREFERRED EMBODIMENTS

The embodiment of the present invention will hereinafter be described with reference to the accompanying drawings.

Figure 1:
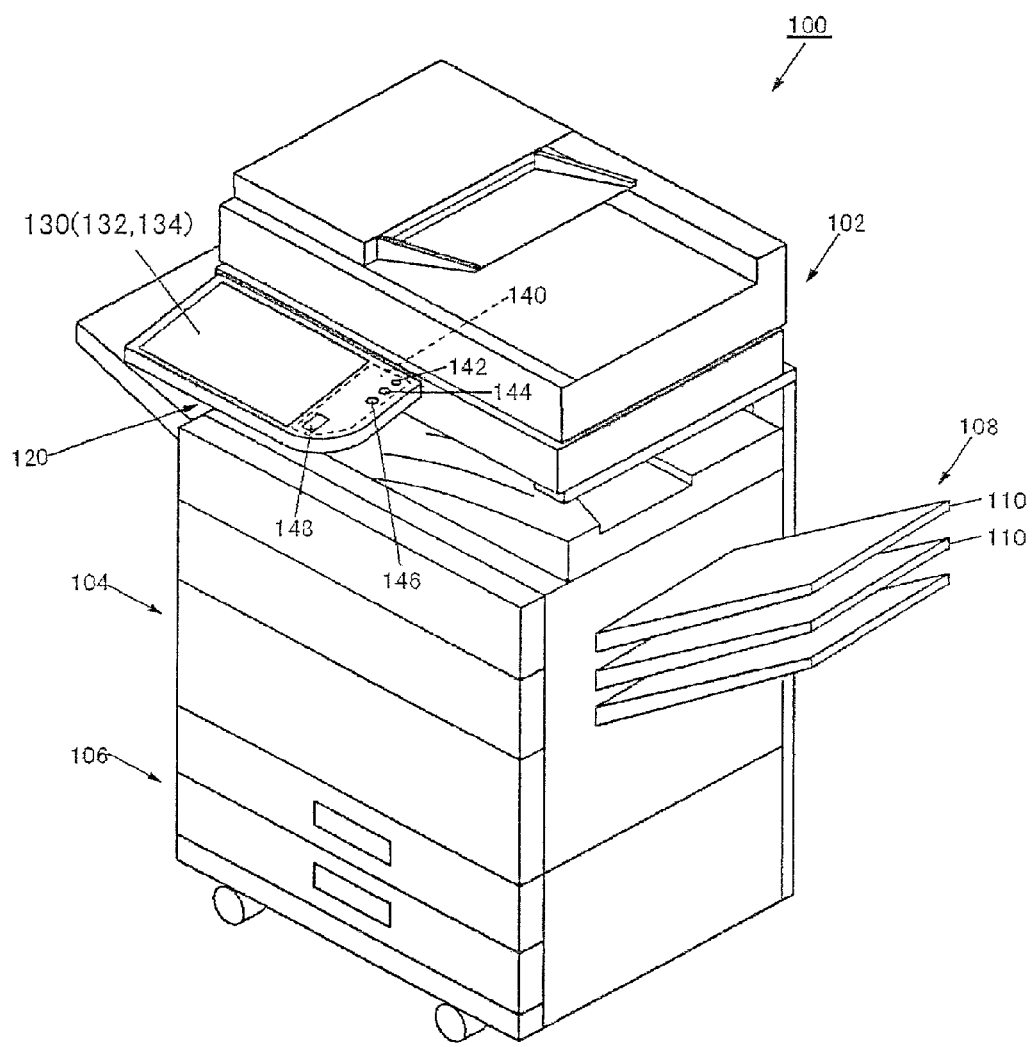
FIG. 1 is a perspective view showing a configuration of an image forming apparatus according to the embodiment of the present invention.
Figure 2:
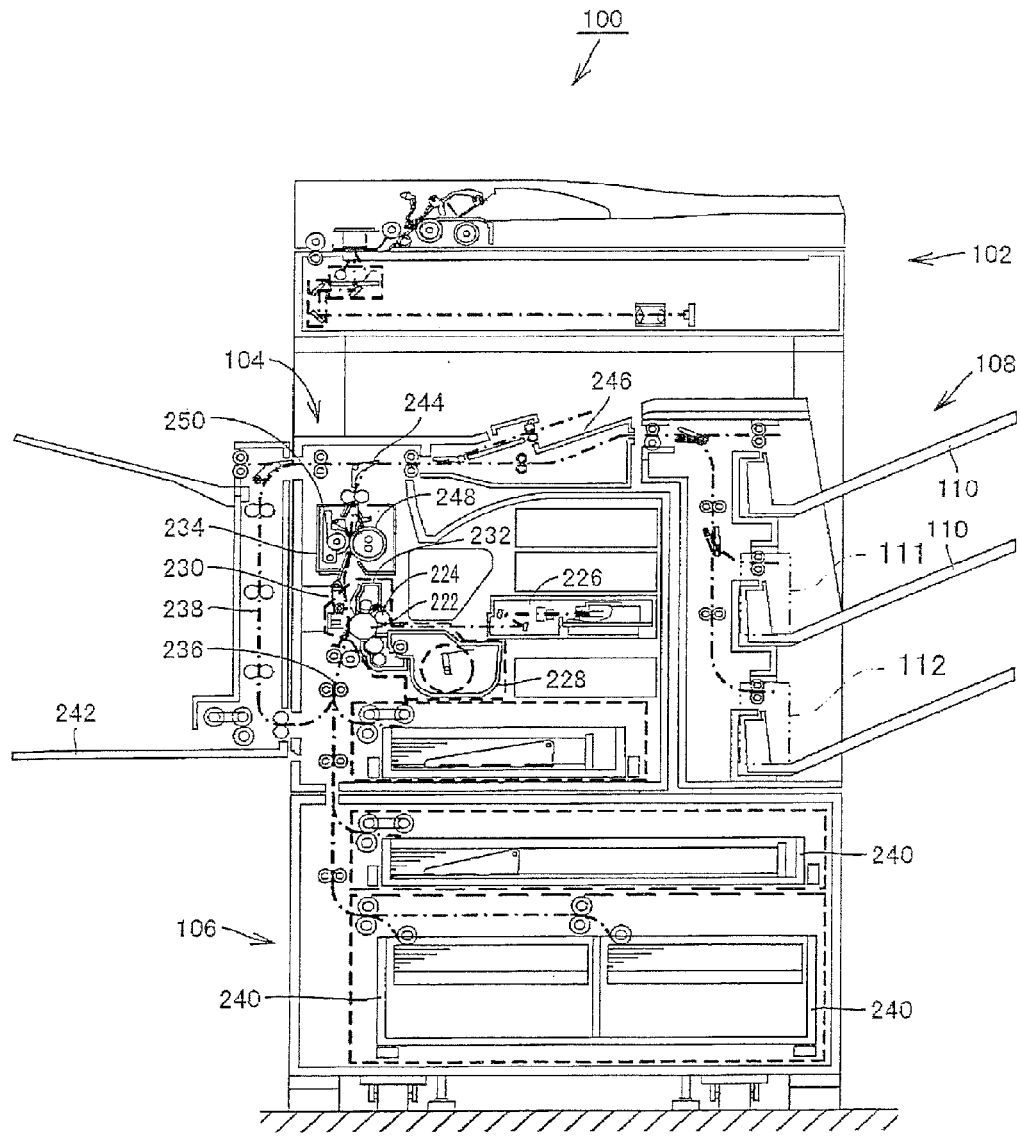
FIG. 2 is an illustrative view schematically showing the internal mechanisms of the image forming apparatus.
Figure 3:
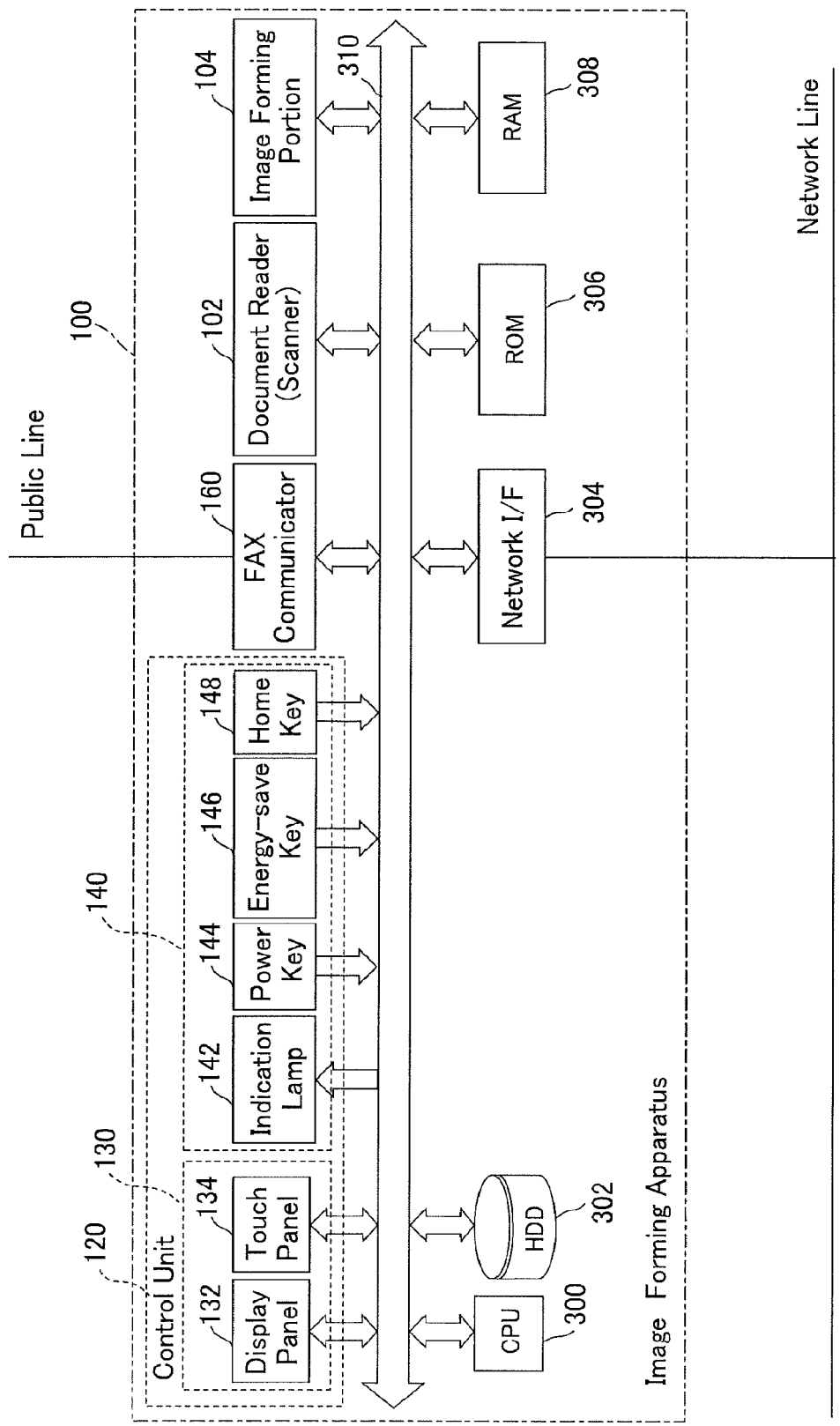
FIG. 3 is a functional block diagram showing a hardware configuration of the image forming apparatus.
Figure 4:
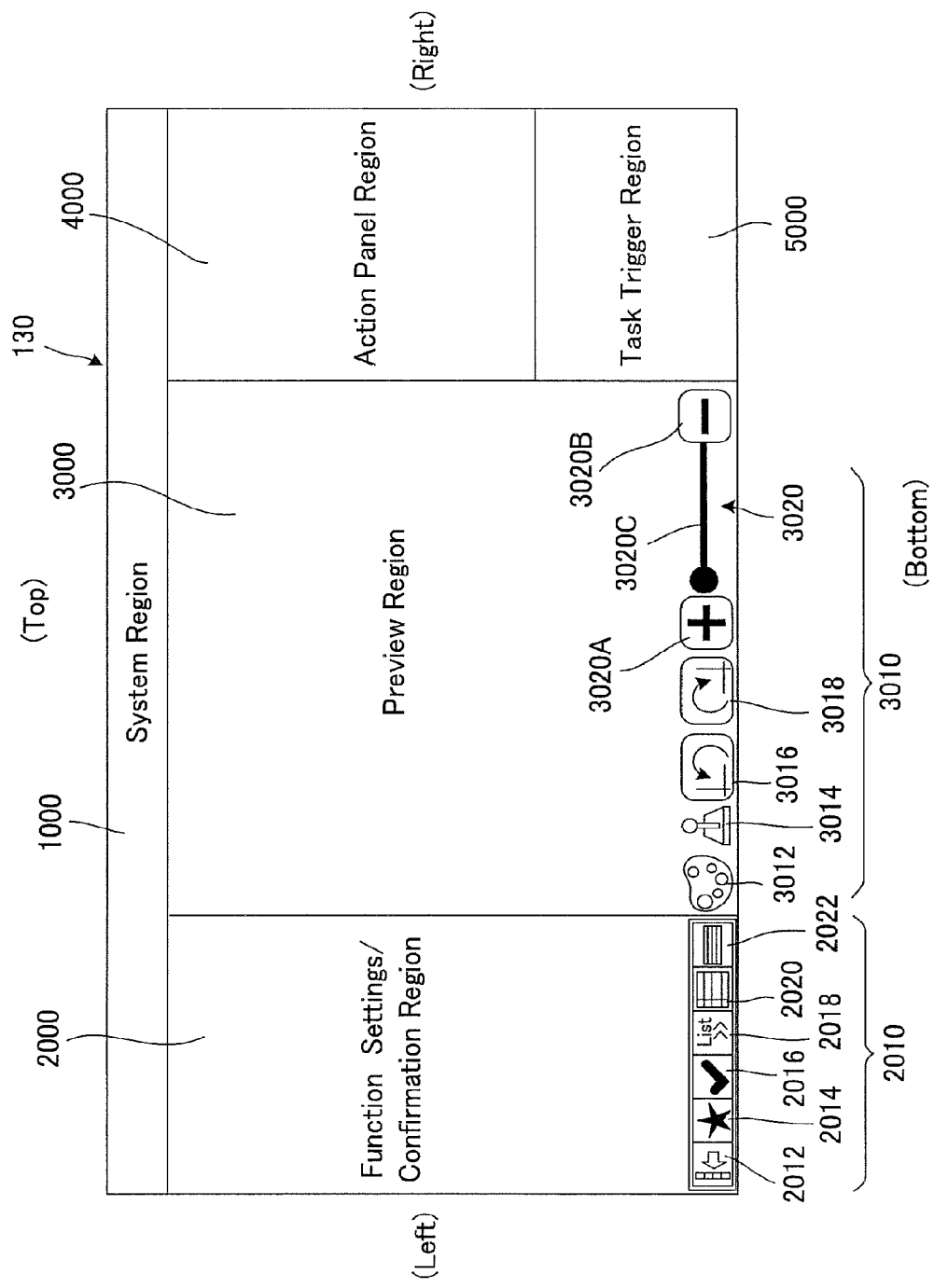
FIG. 4 is an illustrative view showing display regions on a touch panel display of the image forming apparatus.
Figure 5:
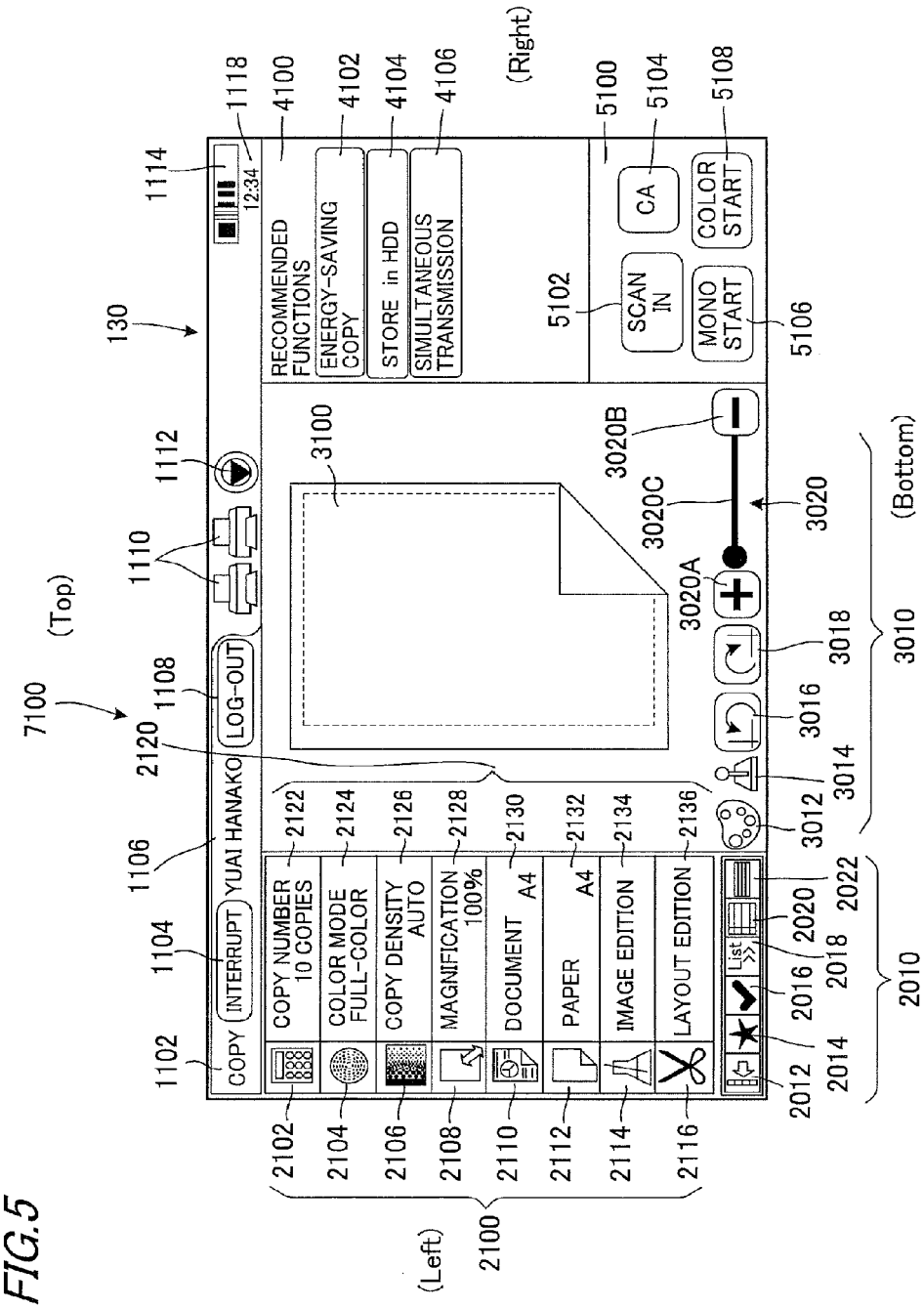
FIG. 5 is an illustrative view showing a screen example displayed on the touch panel display.
Figure 6:
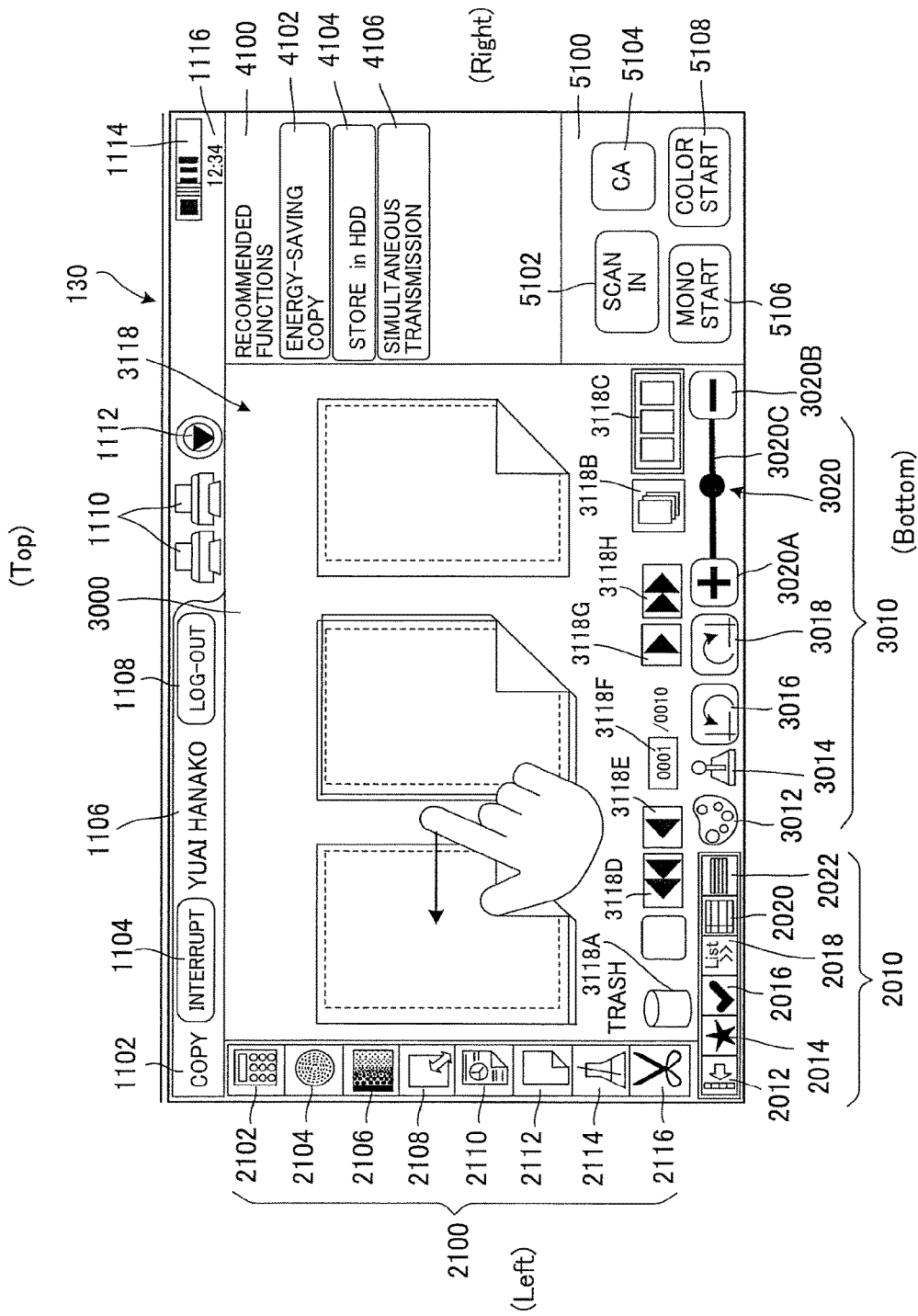
FIG. 6 is an illustrative view showing a state where the preview region being displayed on the touch panel display is changed.

FIG. 1 is an illustrative view of one example mode of carrying out the present invention, showing an overall configuration of an image forming apparatus including an image display control device according to the present embodiment of the present invention. FIG. 2 is an illustrative view schematically showing the internal mechanisms of the image forming apparatus. FIG. 3 is a functional block diagram showing a hardware configuration of the image forming apparatus. FIG. 4 is an illustrative view showing a preview display region on a touch panel display of the image forming apparatus. FIG. 5 is an illustrative view showing a screen example displayed on the touch panel display. FIG. 6 is an illustrative view showing a state where the preview region being displayed on the touch panel display is modified.

An image forming apparatus 100 according to the embodiment of the present invention, as shown in FIG. 1, includes a control unit (image display control device) 120 having a touch panel display (display controller) 130 capable of displaying plural pages of document images in a preview representation on a display panel (control screen) 132.

Here, the multiple document images displayed on display panel (control screen) 132 may include preview display images of document images captured by the document reader etc., of image forming apparatus 100 and finished preview images of the images formed on recording paper by the image forming portion.

Image forming apparatus 100 is a kind of an image processing apparatus. The image display control device according to the present invention is also applicable to image processing apparatus and electronic appliances other than the image forming apparatus of this kind.

Further, image forming apparatus 100 includes a plurality of operational modes, and is equipped with a display device for displaying information for each operational mode. The display device is preferably constructed so as to be able to display information the user wants in a user friendly manner even if the user does not remember the screen configuration when the operational mode is changed over.

Here, image forming apparatus 100 is configured to include a touch panel display (control screen) that can be controlled by both gesture control and touch control other than gesture control, but the image forming apparatus may use a touch panel display that can be controlled by touch control only. Alternatively, the image forming apparatus may include a display panel that cannot be touch-controlled but can display only, with keys for control.

Here, gesture control means controls that are related to various kinds of movements of fingers in combination with GUI (Graphic User Interface), such as responses in accordance with the distance moved and speed of the fingers, double-tapping, the moving fingers trace and the like that are given with meanings.

This image forming apparatus 100 forms images on recording paper based on electrophotography.

Image forming apparatus 100 includes, as its operation modes, copy mode, facsimile mode (FAX mode), document filing mode (a mode in which scanned images are stored in a storage inside the image forming apparatus) and mail mode (a mode in which scanned images are transmitted in the form of an attachment file to an e-mail). This image forming apparatus 100 may further have a network printer mode.

The display screen in image forming apparatus 100 changes every time the operation mode is switched. Further, the printing mechanism is not limited to electrophotography.

To begin with, image forming apparatus 100 will be described.

Image forming apparatus 100 of the present embodiment includes document reader 102, image forming portion 104, a paper feed portion 106, a paper output processor 108 and a control unit 120.

Control unit 120 is formed of a touch panel display 130 and a display control portion 140.

Touch panel display 130 is comprised of a display panel 132 of a liquid crystal panel or the like and a touch panel (touch control detecting means) 134 that is laid over display panel 132 to detect the positions the user presses with fingers.

Display control portion 140 includes an indication lamp 142, a power key 144, an energy-save key 146 and a home key 148 that resets the display content of touch panel display 130 to the home screen for operational mode selection.

In this way, image forming apparatus 100 has touch panel display 130 as a main control device and also has a display control portion 140 that includes the hardware keys and indication lamps.

The keys (power key 144, energy-save key 146 and home key 148) on display control portion 140 are given as hardware buttons, in contrast to software buttons formed by touch panel display 130.

Note that image forming apparatus 100 should not be limited to that including display control portion 140 of this kind, but may be provided with touch panel display 130 only. That is, it will work as long as the initial screen of the selected operational mode can be actuated when the user selects an operational mode on the home screen displayed on touch panel display 130. Next, the operational modes of this image forming apparatus 100 will be described.

(Copy Mode)

The operation of the copy mode of image forming apparatus 100 will be described.

In this copy mode, image reader (which will be referred to hereinbelow as "scanner") 102 and image forming portion 104 operate mainly.

A document placed on a document placement table is read as image data by scanner 102 and the read image data is input to a CPU 300 of a microcomputer etc. shown in FIG. 3, where the image data undergoes various kinds of image processing, and the processed image data is output to image forming portion 104.

As shown in FIG. 2, image forming portion 104 is a mechanism that prints images of documents given as image data onto recording mediums (recording paper in most cases), including a photoreceptor drum 222, a charging device 224, a laser scan unit (which will be referred to hereinbelow as "LSU") 226, a developing device 228, a transfer device 230, a cleaning unit 232, a fixing unit 234, an unillustrated charge eraser and other devices.

Also, image forming portion 104 is provided with a main feed path 236 and a reverse feed path 238. The recording paper fed from paper feed portion 106 is conveyed along main feed path 236. Paper feed portion 106 draws recording paper, one sheet at a time, from a stack of recording paper, held in a paper feed cassette 240 or set on a manual feed tray 242 and delivers the recoding paper to main feed path 236 of image forming portion 104.

In the course of the recording paper being conveyed along main feed path 236 of image forming portion 104, the recording paper passes through and between photoreceptor drum 222 and transfer device 230 and then passes through fixing device 234 to perform printing for the recording paper.

While photoreceptor drum 222 rotates in one direction, its surface is cleaned by cleaning device 232 and the charge erasing device, then uniformly electrified by charging device 224.

LSU 226 modulates the laser beam based on the image data to be printed and repeatedly scans the laser beam over the photoreceptor drum 222 surface in the main scan direction, to form an electrostatic latent image on the photoreceptor drum 222 surface.

Developing unit 228 supplies toner to the photoreceptor drum 222 surface and develops the electrostatic latent image to form a toner image on the photoreceptor drum 222 surface.

Transfer device 230 transfers the toner image on the photoreceptor drum 222 surface to the recording paper which passes through the nip between the transfer device 230 and photoreceptor drum 222.

Fixing device 234 includes a heat roller 248 for heating recording paper and a pressing roller 250 for pressing recording paper. The recording paper is heated by heat roller 248 and pressed by pressing roller 250 so that the toner image transferred to the recording paper is fixed to the recording paper. A heater in the heat roller is heated by the power supplied to this fixing unit 234 so as to control and keep heat roller 248 at a temperature suitable for fixing. When the apparatus enters the energy saving mode, for instance the power supplied to this heater is stopped or cut down.

Arranged at the junction between main feed path 236 and reverse feed path 238 is a branch claw 244. When printing is performed on one side of recording paper only, branch claw 244 is positioned so as to lead the recording paper from fixing device 234 toward a paper output tray 246 or paper output processor 108.

When printing is performed on both sides of recording paper, branch claw 244 is rotated in the predetermined direction so that the recording paper is once conveyed toward the paper output tray 246 side. Then, the paper is switched back and conveyed toward reverse feed path 238. The recording paper then passes through reverse feed path 238 and is inverted upside down and fed to main feed path 236 again. The recording paper is once again printed on its rear side in the course of main feed path 236 and lead to paper output tray 246 or paper output processor 108.

The recording paper thus printed is lead to paper output tray 246 or paper output processor 108 and discharged to either paper output tray 246 or each of paper output trays 110 of paper output processor 108.

In paper output processor 108, a plurality of recording sheets are sorted and discharged to individual paper output trays 110, and/or each set of recording sheets is punched or stapled. For example, when multiple copies of printed documents are prepared, the printed recording sheets are sorted and discharged to paper output trays 110 so that one copy of the printed documents is allotted to individual paper output tray 110, and the printed documents on each paper output tray 110 are punched by a punching unit 111 or stapled by a stapling unit 112 to prepare individual printed material.

(Facsimile Mode)

Next, the operation in facsimile mode will be described.

In this facsimile mode, the transmitting operation is mainly effected by document reader (scanner) 102 and a FAX communicator 160, as shown in FIG. 3. The receiving operation is mainly effected by FAX communicator 160 and image forming portion 104.

(Transmitting Operation)

The transmitting operation is performed by the steps of: selecting the facsimile mode, reading image data from a document placed on the document placement table by means of document reader 102, supplying the read image data to CPU 300 made up of a microcomputer etc. shown in FIG. 3 where the image data is subjected to various kinds of image processes, and outputting the thus obtained image data to the FAX communicator (FAX communicator 160 in FIG. 3).

As shown in FIG. 3, FAX communicator 160 of the transmission side image forming apparatus 100 connects the selected transmitter side line to the designated destination, converts the image data into communication data conforming to the facsimile communication standard and transmits the communication data to the receiver side facsimile machine (e.g., image forming apparatus 100 having a facsimile function).

(Communication Operation)

When connection of the line is established, FAX communicator 160 of image forming apparatus 100 on the receiver side detects a communication request signal from FAX communicator 160 of image forming apparatus 100 on the transmitter side and sends a response signal. Then, for example, FAX communicators 160 on both the transmitter and receiver sides exchange facsimile performance information of their own with each other and determine the communication rate and coding and code correction scheme of the image data within the available maximum capacity to set up a modem communication scheme. The data is transmitted using an image signal scheme conforming to this communication scheme, from FAX communicator 160 of image forming apparatus 100 on the transmitter side to FAX communicator 160 of image forming apparatus 100 on the receiver side. When data transmission is ended, the line is cut off.

(Receiving Operation)

The FAX communicator 160 of image forming apparatus 100 on the receiver side converts the received data into image data and sends the data to image forming portion 104. Here, the received data may be converted into image data by image forming portion 104. Image forming portion 104 prints images of documents represented by the image data converted from the received data, onto recording paper, in the same manner as the above-described operation in copy mode.

Next, the control block configuration of image forming apparatus 100 will be described with reference to the drawings.

As shown in FIG. 3, image forming apparatus 100 includes: control unit 120 that allows the user to set copy mode and facsimile mode; a ROM 306 for storing programs etc.; a hard disk 302 serving as a non-volatile storage area that can hold programs, data and the like even if the power is cut off; and a RAM (Random Access Memory) 308 that offers a storing area when a program is executed.

Image forming apparatus 100 further includes: a bus 310 connected to image reader 102, image forming portion 104, FAX communicator 160, control unit 120, ROM 306, hard disk 302 and RAM 308; and CPU 300 that is connected to bus 310 to realize general functions as an image forming apparatus.

Hard disk 302 records (stores) files of image data of documents scanned by the image forming apparatus 100. Hard disk 302 also stores initial screen data for each operational mode. The files and data stored in hard disk 302 can also be recorded in ROM 306.

Stored in ROM 306 are programs, data and the like necessary for controlling the operation of image forming apparatus 100. As the data stored in ROM 306 with the programs, the initial screen data for each operational mode may be stored. CPU 300 controls image forming apparatus 100 in accordance with the programs and data stored in ROM 306 and performs control associated with each function of image forming apparatus 100.

As shown in FIG. 3, a public line for exchange of image data is connected to FAX communicator 160 of this image forming apparatus 100 while a network line is connected to a network interface 304. This network line may be connected to a computers etc. that use this image forming portion 100 as a network printer or may be connected via the internet to a computer etc. that is identified by a designated URL (Uniform Resource Locator). When connected to the Internet in this way, the image forming apparatus 100 can obtain the necessary information via the Internet.

RAM 308 offers a function as a working memory for temporarily recording the result of the operation and processing by CPU 300 and a function as a frame memory for recording image data.

Control of image reader 102, image forming portion 104, touch panel display 130 and display control portion 140 forming control unit 120, ROM 306, hard disk 302 and RAM 308 is performed by CPU 300 executing predetermined programs. Here, control unit 120 communicates with CPU 300 by way of an input/output interface.

Control unit 120 is given as a board-like panel that is tilted so as to allow the user ease of view. Control unit 120 includes touch panel display 130 in the left area and display control portion 140 (including indication lamp 142 and hardware buttons, namely, power key 144, energy-save key 146 and home key 148) in the right area on the top thereof. Touch panel display 130 and display control portion 140 are integrally provided in control unit 120.

As described above, this touch panel display 130 is formed of display panel 132 and touch panel 134 that is laid over display panel 132.

Touch panel display 130 displays on display panel 132 the home screen for selection of the operational mode of image forming apparatus 100, the current status of this image forming apparatus 100, the status of destination selection, job processing status and the like. Displayed in the display region of display panel 132 are selection buttons as software keys. When the displayed area of a selection button is pushed by a finger, touch panel 134 detects the pushed position. Then, the position on which touch panel 134 is pressed is compared with the positions of selection buttons so as to perform selection of an operational mode of image forming apparatus 100, functional setting, operational instructions, and the like. In addition to this touch control (command input control based on the position of the user's pressing), this image forming apparatus 100 also supports the above-mentioned gesture control (command input control based on the trace of user's control motion).

Further, indication lamp 142 of display control portion 140 is made up of a LED (Light Emitting Diode) for instance and is controlled by CPU 300 so as to turn on/off (/flash on and off). When the user presses down power key 144 that is provided separately in addition to the main power switch, this image forming apparatus 100 comes out of standby mode (in which, for example, only fax reception is permitted with the main power turned on) to active mode so that the whole operational modes of this image forming apparatus 100 can be used. Indication lamp 142 comes on in link with this status. Further, when a predetermined period has elapsed without receiving any user input, or when the user presses energy-save key 146, this image forming apparatus 100 comes out of active mode into energy save mode so that only part of the operational modes of image forming apparatus 100 are operational. Indication lamp 142 flashes on and off in link with this status. Further, when the user presses energy-save key 146 in this energy save mode, the image forming apparatus 100 comes out of energy save mode into active mode. Home key 148 is a hardware key for returning the display of touch panel display 130 into the initial condition (home screen). It is noted that the operations when power key 144, energy-save key 146 and home key 148 are pressed should not be limited to these.

The hardware keys on display control portion 140 (power key 144, energy-save key 146 and home key 148) may be embedded with a key lamp controlled by CPU 300 so as to turn on/off (/flash). For example, this key lamp may be a round type key ring-like lighting or center lighting. This key lamp turns on at the timing that the hardware key is permitted to use as a control device (at the timing that operation is performed when the hardware key is used).

Image forming apparatus 100 has the aforementioned two operational modes (copy mode and facsimile mode). Software buttons for function settings in each operational mode are displayed on touch panel display 130, and also the preview as the on-screen form of forming images, keys for destination setting and the like are displayed as necessary.

When the operational mode is different from that which the user wants, touch panel display 130 displays another screen. Even in such a case, in order for the user to easily find the information the user requests, touch panel display 130 is divided into multiple regions (which also are given in a size variable manner) so as to display necessary information in each region.

In particular, in this image forming apparatus 100, when one operational mode is selected on the home screen of touch panel display 130 provided as the main display control device, the initial screen of the operational mode is displayed.

In this initial screen, (1) the basic layout is formed of five areas, namely "system region", "function selecting region", "preview region", "action panel region" and "task trigger region", which are appropriately arranged, so that the user is able to easily perform input of settings from top left to bottom right (in the same manner as the user moves their gaze and fingers in the conventional machine which is not provided with a large scale touch panel display 130). Further, (2) the concept of the displays of the five regions is consistent in all operational modes, so that the user is able to operate without confusion when another operational mode is used.

The configuration of the basic layout will be described next.

The basic layout in touch panel display 130 will be described with reference to the drawings.

As shown in FIG. 4, the basic layout of touch panel display 130 is designed in the laterally long touch panel display 130 such that a system region 1000 is arranged at the topmost part, a preview region 3000 in the center of the screen, a function settings/confirmation region 2000 on the left side of preview region 3000, an action panel region 4000 on the upper right part of preview region 3000, and a task trigger region 5000 on the lower right of preview region 3000. Here, the laterally long touch panel display 130 is formed of, for example, 1024 pixels wide×600 pixels high. Further, function settings/confirmation region 2000 will be written hereinbelow as function selecting region 2000.

It is noted that the number of regions in touch panel display 130 should not be limited to five. Also, the horizontal arrangement should not be limited so that the horizontal arrangement may be reversed right side left, for example, depending on the user's dominant hand. Further, the position of system region 1000 may be disposed at the lowermost part. Alternatively, the system region 1000 may be undisplayed depending on the status or settings.

System region 1000 displays the current status of this image forming apparatus 100, e.g., the title of the operational mode in control and the status and conditions of image forming apparatus 100. For example, displayed in system region 1000 are the name of operational mode, the cut-in key, the log-in user name, the job status in progress, the usage status of built-in memory, time and the like.

In function selecting region 2000, settings in each function, display switching, function selecting menu (icons, buttons, etc.) operated by user to confirm settings are variably displayed in a selected display style, i.e., in icon mode, regular mode or express mode. In icon mode, only icons for function setting are displayed in function selecting region 2000 so as to maximize the size of preview region 3000. In express mode, the display of function selecting region 2000 is enlarged so as to allow the user to set the function all at once though the size of preview region 3000 is minimized. In regular mode, preview region 3000 is sized between that in the icon mode and that in the express mode while in function selecting region 2000 the text of function titles is displayed together with functional setting icons.

These icon mode, regular mode and express mode are switched from one to another based on user control. That is, the size of preview region 3000 is modified and displayed in accordance with user control. In this way, since icons are able to give information to the user by using limited area, it is preferable that every function is given with an icon so as to be able to enlarge the display of preview region 3000.

This function selecting region 2000 includes at its bottom a group of select buttons 2010 for switching the display style in function selecting region 2000. Arranged in the group of select buttons 2010 are an icon mode entering button 2012 for displaying function selecting region 2000 in icon mode, a favorite button 2014 for displaying the functions registered as "favorites", a check button 2016 for displaying the functions whose settings have been modified, a list button 2018 for displaying a list of all the functions that can be designated in the selected operation mode, a regular mode entering button 2020 for displaying function selecting region 2000 in regular mode, and an express mode entering button 2022 for displaying function selecting region 2000 in express mode.

Here, when there are many pieces of information to be displayed in function selecting region 2000, the information is displayed in this function selecting region 2000, in a vertically scrollable manner. In this case, this group of select buttons 2010 is not scrolled but constantly displayed in the bottom-most portion of function selecting region 2000.

Preview region 3000 displays the image of the output pages of the (finished) document. The image is displayed using dummy data or scanned data, and the displayed image in preview region 3000 is revised every time the user changes the finish. There are two modes of displaying the finish in this preview region 3000: the display of the final preview with a dummy image in virtual mode before scanning and the display of the final preview with actual images in scan-in mode after scanning. The virtual mode further has two types, before setting documents and after setting documents.

At the bottom of this preview region 3000 there is a group of preview select buttons 3010 for changing the display style in preview region 3000. The group of preview select buttons 3010 includes a rotate-left button 3016 for rotating the image left 90 degrees and a rotate-right button 3018 for rotating the image right 90 degrees and a zoom bar 3020. Other than these, for example a change color button 3012 and preview control button 3014 are arranged.

With this, when rotate-left button 3016 is touched once, the preview rotates 90 degrees left. When the button is touched twice, the preview is rotated 180 degrees left (inverted upside down). Alternatively, when the image of the finished document displayed in the preview region is gesture-controlled (by rotating the document image 180 degrees counterclockwise with the fingertip), the preview is rotated 180 degrees left or inverted upside down.

When rotate-right button 3018 is touched once, the preview rotates 90 degrees right. When the button is touched twice, the preview is rotated 180 degrees right (inverted upside down). Alternatively, when the image of the finished document displayed in the preview region is gesture-controlled (by rotating the document image 180 degrees clockwise with the fingertip), the preview is rotated 180 degrees right or inverted upside down.

When the (+) button 3020A of zoom bar 3020 is touched, or when bar 3020C is gesture-controlled (by the "drag or slide" gesture) toward the (+) button 3020A, the preview image is enlarged. Alternatively, when the image of the finished document displayed in the preview region is gesture-controlled (on the document image by the "pinch out/pinch open" gesture with fingertips), the preview image is enlarged. Here, the "drag" gesture is an action of moving the finger. The "pinch out/pinch open" is an action of spreading the two fingertips apart.

When the (−) button 3020B of zoom bar 3020 is touched, or when bar 3020C is gesture-controlled (by "drag or slide" gesture) toward the (−) button 3020B, the preview image is reduced. Alternatively, when the image of the finished document displayed in the preview region is gesture-controlled (on the document image by the "pinch in/pinch close" gesture with fingertips), the preview image is reduced. Here, the "pinch in/pinch close" is an action of bringing the two fingertips together.

When there are many pages of document images to be displayed in preview region 3000, touchable displayed page select buttons (page number input buttons, page up and down buttons, single page display button and multiple page display button, etc.) may be displayed. In this case, it is also possible to turn over or return the page of the document to be previewed by a gesture control (flicking) of the document image. Further, when the document image to be displayed in preview region 3000 is large, scroll bars that can be touched or gesture-controlled may be displayed. The flicking gesture is an action of the finger sweeping lightly.

Action panel region 4000 displays information such as hint, advice and suggestion for operation and control. Display in this action panel region 4000 is given such that when a particular function is selected by a certain user, the functions associated with the subject function may be displayed, another function as to the subject function may be displayed in a purpose-oriented manner, or the function that was selected in the past in combination with the subject function by the same user or a user of the group to which this user belongs may be displayed as a "recommended function".

Task trigger region 5000 displays trigger items that the user operates in order to actually cause the image forming apparatus 100 to operate after all the settings in the operational mode have been completed. An example is the start button (software button) for starting the operation. Here, since information on a lack of a consumable supply is also related to the unfeasibility of the task in the operational modes needing a printing process (other than fax transmission), this should be also displayed in this "task trigger region".

In this case, it is also preferable that the start button is displayed only when the start button can be pressed down. The condition in which the start button can be pressed down, means a state where all settings have been completed and none of consumable supplies (recording paper and toner) will run short in the case of an operational mode needing a printing operation or a state where all the transmission parameters including destination have been set in the case of a fax mode (transmission) operation as the operational mode needing no printing.

The layout of these five regions is not changed even if the operational mode is switched from one to another (in the initial screen of any operational mode). Further, each region may change in size, expanding or contracting in the horizontal (longitudinal) direction of the screen of touch panel display 130 as in the case where the display of function selecting region 2000 (and preview region 3000) is switched between icon mode, regular mode and express mode.

The layout of the five regions is designed in light of the user interfaces in conventional machines, by directing attention to user's path of gaze and control. This arrangement leads the user to perform settings by moving their gaze from top left to bottom right and moving their input action (fingers of the dominant hand) from top left to bottom right.

In this arrangement, for switching the operational mode from one to another, the user presses down home key 148 (FIG. 3) and selects another operational mode on the home screen. In this way, it is possible to change operational mode by way of the home screen.

(Initial Screen Display Operation in Copy Mode)

When copy mode is selected, the initial screen for copy mode is displayed on touch panel display 130 using copy mode initial screen data loaded from hard disk 302 (FIG. 3) or the like.

In this occasion, a copy mode initial screen 7100 is displayed for example, on touch panel display 130, as shown in FIG. 5. Copy mode initial screen 7100 displays information using the five divided regions laid out as described above.

In system region 1000 (FIG. 4) of copy mode initial screen 7100, areas 1102, 1104, 1106, 1108, 1110, 1112, 1114 and 1116 are laid out as shown in FIG. 5.

Area 1102 denotes the operational mode being selected (copy mode in this case). Displayed in area 1102 is the name and/or icon of the operational mode.

It is also preferred that a pulldown menu showing operational modes is displayed so as to allow for switching of operational mode when this area 1102 is touch-controlled, tapped or double-tapped (the same in other operational modes).

Area 1104 displays sub information entailing the selected operational mode.

In area 1104 a cut-in key (software button) is displayed as sub information. When this cut-in key is touched, tapped or double-tapped, a cut-in process can be actuated in copy mode.

Area 1106 displays the log-in user name.

In area 1108 a log-out button (software button) is displayed.

Area 1110 displays the status of the job in progress.

Area 1112 displays buttons (software buttons) related to job status.

That is, area 1112 displays the status of the job in progress with an icon. This job status is touch-controlled, tapped or double-tapped, the job status information is displayed in detail. It is further preferable that a button for suspending the selected job and the like is displayed in area 1112.

Area 1114 displays the communication status and area 1116 displays the current time.

Displayed in function selecting region 2000 (FIG. 4) on copy mode initial screen 7100 are a function selecting menu 2100 that allows the user to select in copy mode and a group of select buttons 2010 described above. In the screen shown in FIG. 5, the function select menu is displayed in regular mode.

As shown in FIG. 5, the function select menu displayed in regular mode is composed of a group of icons 2100 and a group of texts 2120. As the function select menu displayed in function selecting region 2000, texts 2122, 2124, 2126, 2128, 2130, 2132, 2134 and 2136 are displayed.

Text 2122 shows an icon 2102 for setting the number of copies and its set content.

Text 2124 shows an icon 2104 for setting color mode and its set content.

Text 2126 shows an icon 2106 for setting copy density and its set content.

Text 2128 shows an icon 2108 for setting copy magnification and its set content.

Text 2130 shows an icon 2110 for setting the document type and its set content.

Text 2132 shows an icon 2112 for setting the paper type and its set content.

Text 2134 shows an icon 2114 for image edition and its set content.

Text 2136 shows an icon 2116 for layout edition and its set content.

Here, it should be noted that a greater number of items can be also displayed in the function setting menu, in a vertically scrolling manner with the position of select buttons 2010 fixed. In this case, the displayed items inclusive of hidden items above and below, can be changed from one to another by any of touch control (scroll control) and gesture control (flick control in the vertical direction).

Here, the image edition is edition for one page document, and includes, as a lower-layered menu, frame deletion, printing menu, watermark, user stamp and the like. The layout edition is edition for multiple pages of documents, and includes, as a lower-layered menu, page integration, binding margins, page change, centering and the like. Subordinates menus under these will be displayed on touch panel display 130 by touching, taping or double-tapping icons 2102 to 2116 or texts 2112 to 2136.

Arranged in preview region 3000 (FIG. 4) on copy mode initial screen 7100 are a document output (finish) image 3100 and a group of preview select buttons 3010 stated above. In this arrangement, dummy data or scanned data is used to display image 3100, and the image 3100 is changed and displayed in preview region 3000 every time the function setting menu in function selecting region 2000 is changed (the preview display is changed).

Displayed in action panel region 4000 (FIG. 4) on copy mode initial screen 7100 is information such as hint, advice and suggestion for copying operation. Here, recommended functions in the copy mode that the user selects are displayed as shown in FIG. 5. In this case, action panel region 4000 includes an area 4100 for displaying the content of displayed information and areas 4102 to 4106 that serve in themselves as software buttons and display text indicating recommended functions.

When area 4102 is touch-controlled, tapped or double-tapped, a pulldown menu of further detailed information for energy-saving in copying is displayed. In this case, for example a software button for entering the function setting screen for duplex copying is displayed with text "Duplex printing will save paper", a software button for entering the function setting screen for page integration with text "Printing multiple documents integrally will save paper", and a software button for entering the function setting screen for saddle stitch binding with text "Printing can be done so as to bind the paper as a booklet".

Displayed in task trigger region 5000 (FIG. 4) on copy mode initial screen 7100 is a group of command buttons 5100. These command buttons 5100 include a scan-in key (software button) 5102, a clear-all key (software button) 5104, a monochrome start key (software button) 5106 and a color start key (software button) 5108.

Scan-in key 5102 is a key for causing image forming apparatus 100 to scan a document to obtain image data.

Clear-all key 5104 is a key for clearing the set functions.

Monochrome start key 5106 is a key for causing image forming apparatus 100 to scan a document and perform monochrome copying.

Color start key 5108 is a key for causing image forming apparatus 100 to scan a document and perform color copying.

In this way, when the user inputs a request in copy mode initial screen 7100 displayed with information in five-divided regions, a copying process is effected in accordance with the request.

Next, description will be made on the switching operation of preview pages when preview region 3000 is enlarged with function selecting region 2000 displayed in icon mode.

When the user flicks left the preview display screen in which a preview image 3118 is displayed as shown in FIG. 6, the input trace is analyzed. In this case, the gesture control by this user is analyzed as a request for turning over the page, and a revised preview image including another page that has not been displayed and corresponds to the direction of the flick is displayed.

It is also possible to change the pages in preview image representation by touching a page forward button 3118G, page fast forward button 3118H, page reverse button 3118E or page fast reverse button 3118D. It is also possible to change the pages in preview image representation by touching a direct pagination button 3118F to directly input the page number the user wants to jump.

In this way, when function selecting region 2000 (FIG. 4) is displayed in icon mode, preview region 3000 is enlarged so that it is possible to display the preview image so as to improve user' visual recognition and user controllability, as shown in FIG. 6. In particular, it is possible to scroll the preview display up to a preview image the user wants by touch control or gesture control, and display the desired preview image.

Here, designated at 3118A in FIG. 6 is a trash icon. When a selected page is dragged to this trash icon 3118A, the page can be deleted.

When a single page display icon 3118B is pressed down, the preview image with, for example three pages displayed, is changed to one page representation (in this case one page is displayed in a large scale). When a multiple page display icon 3118C is pressed down, the preview image with, for example, one page displayed, is changed to three page representation.

Next, the configuration of control unit 120 (FIG. 1) of image forming apparatus 100 will be described in detail with reference to the drawings.

Figure 7:
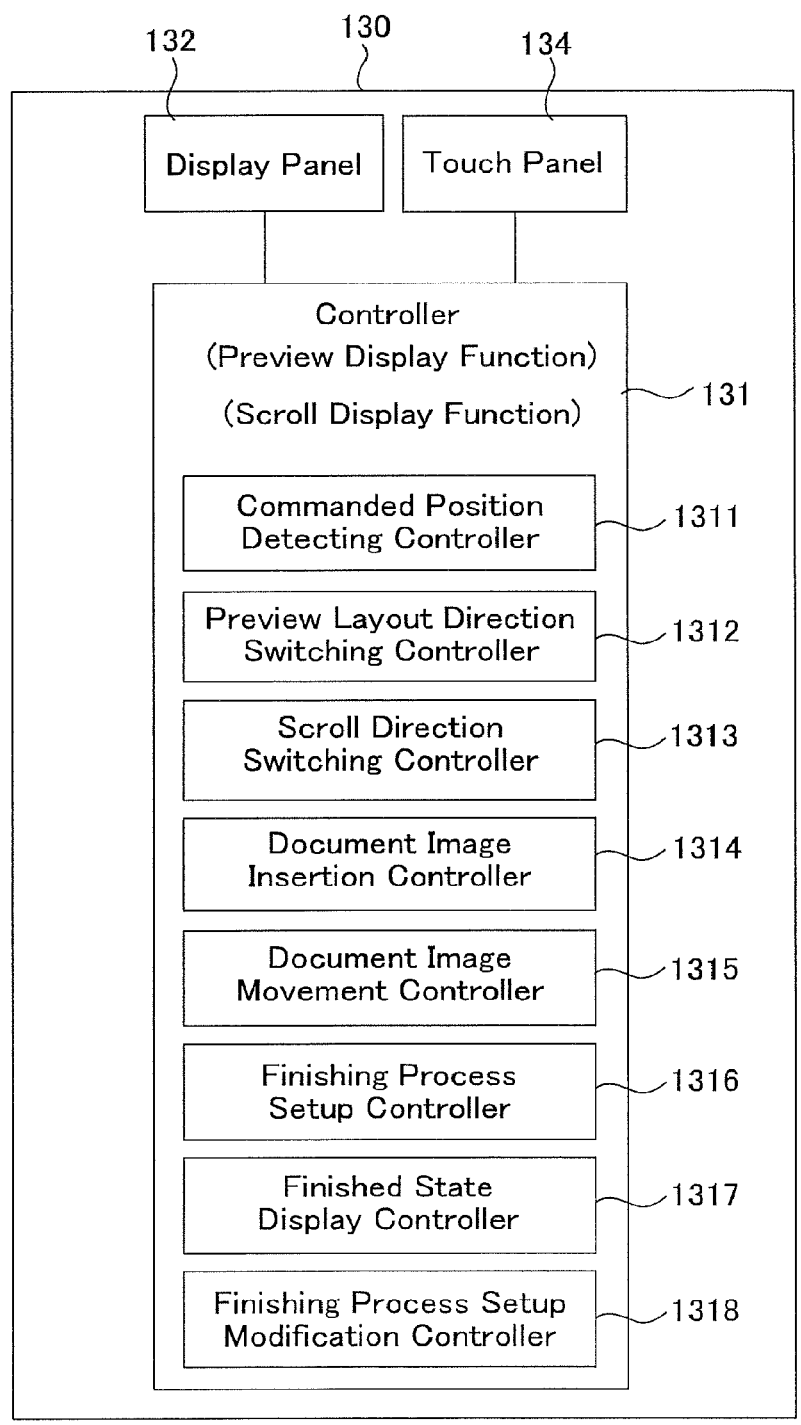
FIG. 7 is a block diagram showing a configuration of the touch panel display.

FIG. 7 is a block diagram showing a configuration of a touch panel display as a component of the control unit of the image forming apparatus of the present embodiment.

Control unit 120 includes, in addition to the above-described configuration, a controller 131 functioning as a display control device in touch panel display 130, as shown in FIG. 7.

Controller 131 has a preview displaying function of presenting multiple pages of document images in preview representation and a scroll displaying function of displaying multiple pages of document images given in preview representation, in a scrollable manner.

Controller 131 includes a commanded position detecting controller 1311, a preview layout direction switching controller 1312, a scroll direction switching controller 1313, a document image insertion controller 1314, a document image movement controller 1315, a finishing process setup controller 1316, finished state display controller 1317 and a finishing process setup modification controller 1318.

Commanded position detecting controller 1311 makes control of detecting a user's commanded position relative to a document image to be the reference (which may also be referred to hereinbelow as "reference document image") among the multiple pages of document images in the preview image displayed on touch panel display 130 when the user designates a position on touch panel display 130 by a touching operation.

Here, how a reference document image is designated is not limited. Designating methods of a reference document image may include automatic designation by controller 131 and user designation. It is also possible to provide a system in which both the automatic designating method by controller 131 and the user designating method are used.

As an example of the automatic designating method of a reference document image by controller 131, the document image located in the center of the multiple images in the preview displayed in preview region 3000 may be automatically designated as the reference document image.

As an example of the designating method of a reference document image by the user, the user can designate a reference document image by using a switching mode selecting button 1320 (FIG. 9) to select "Designate Reference Document Image" and then directly touching a target preview image.

Preview layout direction switching controller 1312 makes control of switching the layout direction in the preview image (direction of laid out document images) in accordance with the commanded position (which may also be referred to hereinbelow as "detected commanded position") detected by commanded position detecting controller 1311.

Scroll direction switching controller 1313 makes control of switching the scrolling direction in the preview image in accordance with the detected commanded position.

Figure 9:
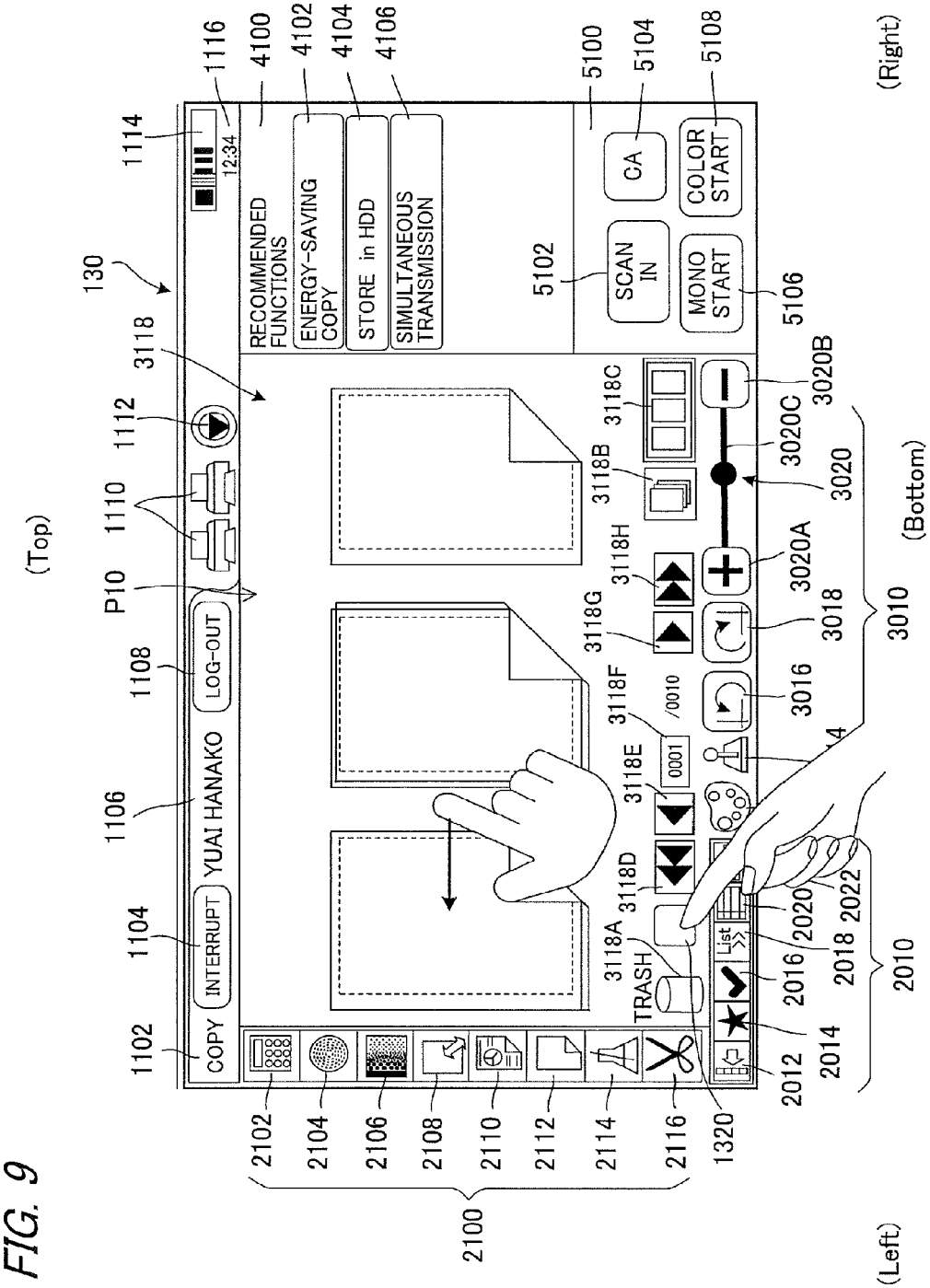
FIG. 9 is an illustrative view showing one preview display example of document images on a touch panel display in an image forming apparatus of example 1 of the present embodiment.

Document image insertion controller 1314 performs control of inserting a new document image (which may also be referred to hereinbelow as "newly inserted document image") into the detected commanded position. Here, when inserting a newly inserted document image into the preview image being displayed, the user selects "Page Insert Mode" using switching mode selecting button 1320 (FIG. 9). A newly inserted document image can be captured by an operation of scan-in key 5102.

Document image movement controller 1315 performs control of moving a document image selected from multiple pages of document images being displayed (which may also be referred to hereinbelow as "moved document image") into the detected commanded position. When entering page move mode, the user selects "Page Move Mode" using switching mode selecting button 1320 (FIG. 9). To specify a moved document image, the user may touch one document image in the preview image by the fingertip after selection of "Page Move Mode".

Finishing process setup controller 1316 performs control of setting up a finishing process.

Finished state display controller 1317 performs control of displaying the finished state of document images in preview representation.

Finishing process setup modification controller 1318 performs control of changing the binding positions designated at the finishing process, in accordance with the detected commanded position.

In the present embodiment, touch panel 134 functions as commanded position detecting controller 1311.

Preview layout direction switching controller 1312 has a first preview layout direction setting function of setting the preview layout direction so that the document images are lined along the direction in which the reference document image and a newly inserted document image are laid out and a second preview layout direction setting function of setting the preview layout direction so that the document images are lined along the direction in which the reference document image and a moved document image are laid out.

Scroll direction switching controller 1313 has a first scroll direction setting function of setting the scrolling direction so that the document images are lined along the direction in which the reference document image and a newly inserted document image are laid out and a second scroll direction setting function of setting the scrolling direction so that the document images are lined along the direction in which the reference document image and a moved document image are laid out.

Preview layout direction switching controller 1312 has a third preview layout direction setting function of setting the preview layout direction so that the document images are lined along the direction (in the commanded direction) from the reference document image toward the detected commanded position. Scroll direction switching controller 1313 has a third scroll direction setting function of setting the scrolling direction along the commanded direction.

Specifically, when commanded position detecting controller 1311 detects a commanded position at the upper or lower side of the reference document image, preview layout direction switching controller 1312 sets the layout direction in the preview image so as to go along the vertical direction on touch panel display 130 while scroll direction switching controller 1313 sets the scrolling direction in the preview image so as to go along the vertical direction on touch panel display 130.

When commanded position detecting controller 1311 detects a commanded position on the left or right side of the reference document image, preview layout direction switching controller 1312 sets the layout direction in the preview image so as to go along the lateral direction on touch panel display 130 while scroll direction switching controller 1313 sets the scrolling direction in the previews so as to go along the lateral direction on touch panel display 130.

Finishing process setup modification controller 1318 has a first binding position modifying function of modifying the binding positions set in the finishing process in accordance with the detected commanded position into which a newly inserted document image is inserted and a second binding position modifying function of modifying the binding positions set in the finishing process in accordance with the detected commanded position to which a moved document image is moved.

Further, preview layout direction switching controller 1312 has a layout direction selecting function of enabling selection of the layout direction in the preview image on touch panel display 130, either from right to left or left to right when the controller switches the layout direction in the preview image on touch panel display 130, from the vertical direction to the lateral direction, in accordance with the detected commanded position.

Next, the switching control of the layout direction of multiple images in the preview entailing the insertion and move of a document image in the preview display of document images presented on touch panel display 130 will be described along the flow chart in FIG. 8.

Figure 8:
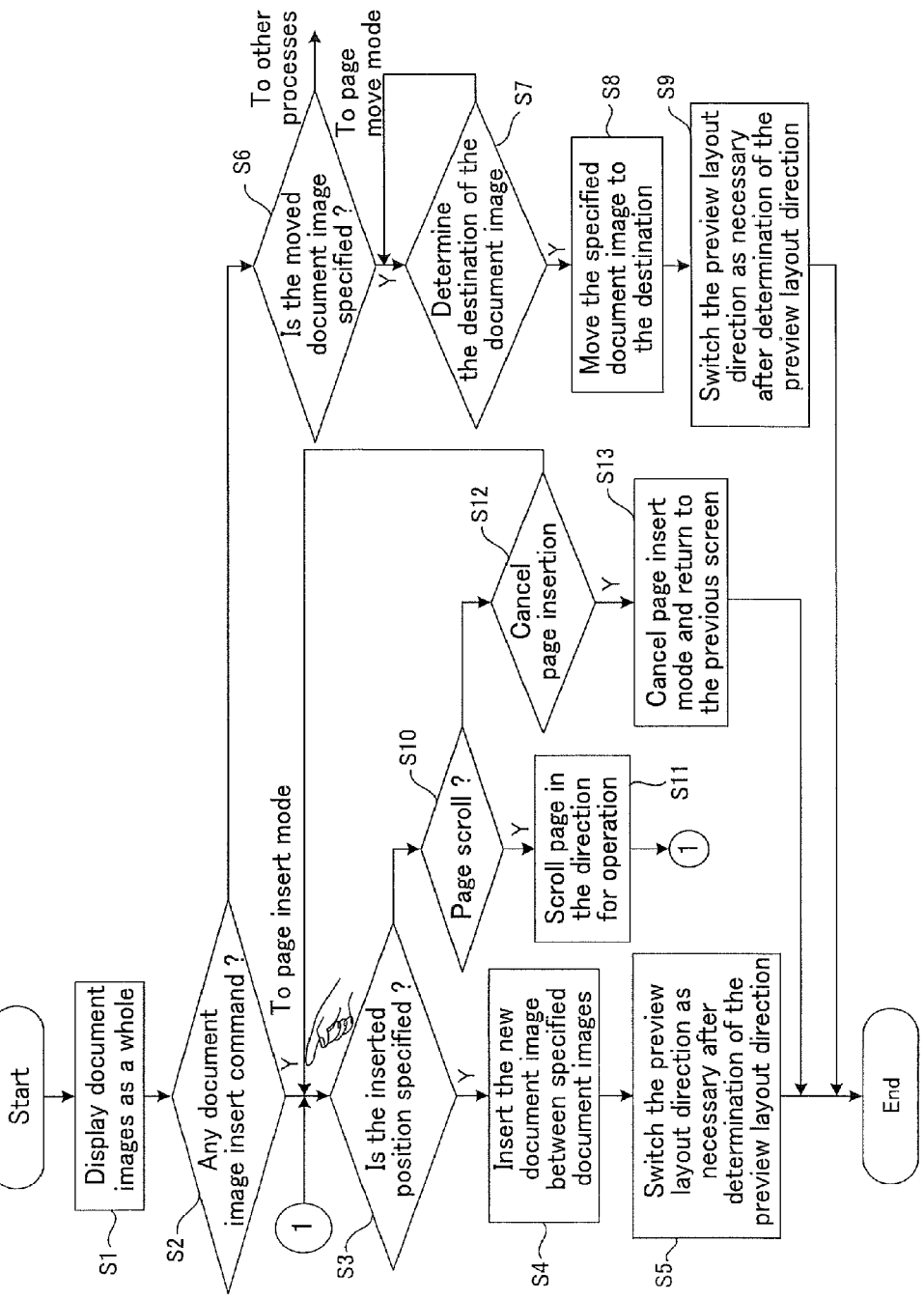
FIG. 8 is a flow chart for showing the procedural steps of a switching operation of changing the layout direction of document images in association with insertion and move of a document image displayed on the touch panel display.

In image forming apparatus 100, switching of the layout direction in which document images to be printed on display panel 132 are displayed in preview representation on touch panel display 130 is controlled based on the operational flow shown in FIG. 8.

As shown in FIG. 8, to begin with, an array of preview document images laid out along a predetermined direction (in the width direction of display panel 132 in this case) is displayed (Step S1). Then, it is determined whether an insert command (select command of "page insert mode") of a new document image is given (Step S2).

When it is determined at Step S2 that an insert command of a new document image has been given, the control enters "page insert mode". Then, it is determined whether the position (at the top, bottom, left or right of the reference document image) to which a new document image will be inserted is specified (Step S3).

At Step S3, when the inserted position of a new document image relative to the reference document image is specified, the new document image is inserted into the detected commanded position (between the reference document image and the adjacent document image) (Step S4).

It should be noted that the position into which a new document image is inserted (the detected commanded position) can be determined as the detected commanded position when commanded position detecting controller 1311 detects the position at which the user touches touch panel 134 by the finger.

Then, preview layout direction switching controller 1312 switches the layout direction in the preview image as required, in accordance with the detected commanded position and displays the preview image on display panel 132 (Step S5). Then, the control operation is ended.

On the other hand, when it is determined at Step S2 that there is no insert command of a new document image, a select command on "page move mode" is checked so that it is determined whether a document image to be moved is specified (Step S6).

At Step S6, when it is determined that a document image to be moved has been specified, it is determined whether the position to which the specified document image should be moved has been determined (Step S7).

It should be noted that the position into which the specified document image is moved (the detected commanded position) can be determined as the detected commanded position when commanded position detecting controller 1311 detects the position at which the user touches touch panel 134 by the finger.

At Step S7, when it is determined that the position to which the specified document image is moved has been determined, the specified document image is moved to the determined, detected commanded position (Step S8).

Then, preview layout direction switching controller 1312 switches the layout direction in the preview image as required, in accordance with the detected commanded position and displays the preview image on display panel 132 (Step S9). Then, the control operation is ended.

When it is determined at Step S3 that the position into which the new document image will be inserted is not specified, it is determined whether a command of page scrolling in the preview image currently displayed on display panel 132 has been given (Step S10).

It is determined at Step S10 that a command of page scrolling has been given, the preview image is page-scrolled in the direction the user designates (Step S11). Then the control returns to Step S3.

On the other hand, when it is determined at Step S10 that there is no command of page scrolling, then it is determined whether there is a command of canceling "page insert mode" (Step S12). It should be noted that cancellation of "page insert mode" or "page move mode" can be executed by selecting "page insert mode cancellation" or "page move mode cancellation" by means of switching mode selecting button 1320 (FIG. 9).

When it is determined at Step S12 that a command of canceling "page insert mode" has been given, "page insert mode" is cancelled so that the screen display on display panel 132 returns to the previous screen display (Step S13), and the control operation is ended.

On the other hand, when it is determined at Step S12 that "page insert mode" has not been cancelled, the control returns to Step S3.

Thus the operation of switching the layout direction in the preview image entailing the insertion or move of a document image can implemented.

As to the switching control of the scrolling direction in the preview image entailing the insertion or move of a document image in image forming apparatus 100, it is possible to give the description on the switching control of the scrolling direction in the preview image, by replacing "preview layout direction switching controller 1312" by "scroll direction switching controller 1313" and "layout direction" by "scroll direction".

Next, switching of the layout direction and scrolling direction of document images in the preview display in touch panel display 130 will be described based on examples with reference to the drawings.

Though the following description will be made using to the drawings in which only the document images displayed on touch panel display 130 are schematically illustrated, the whole screen area of touch panel display 130 may be used to give a preview display of document images as stated before, a preview display may be given in preview region 3000 on touch panel display 130, or it is also possible to give a preview display on the enlarged preview region 3000 with function selecting region 2000 displayed in icon mode on touch panel display 130.

Example 1

Example 1 describes a case where a new document image is inserted to a position lateral to the preview display of multiple document images laid out in the lateral direction (left-and-right direction) on display panel 132.

Figure 10A:
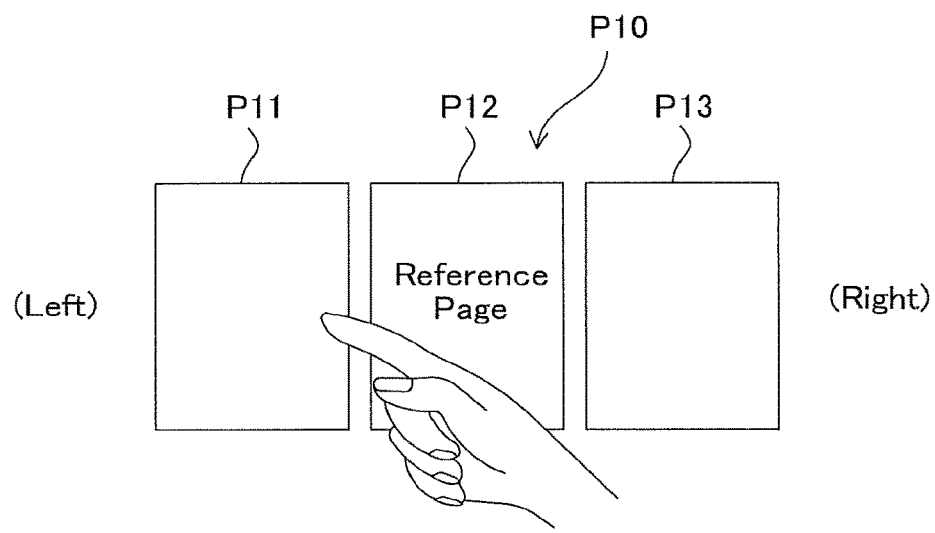
FIG. 10A is an illustrative view showing a state where document images are laid out in the lateral direction and displayed in a preview representation on the touch panel display.
Figure 10B:
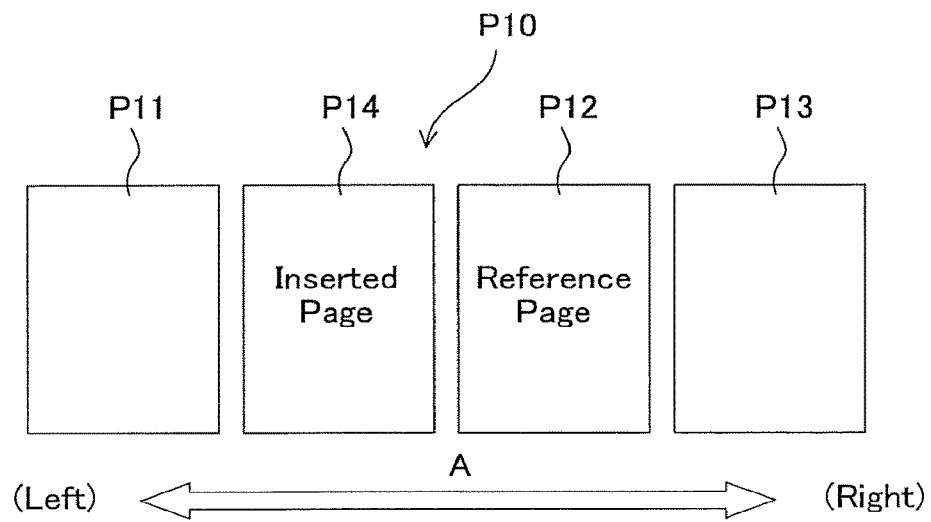
FIG. 10B is an illustrative view showing a preview display when a new document image has been inserted into a position lateral to a reference document image in the preview display.

FIG. 9 is an illustrative view showing one preview display example of multiple document images on the touch panel display of example 1. FIG. 10A is an illustrative view showing a state where multiple document images are laid out in the lateral direction and displayed in a preview representation on the touch panel display. FIG. 10B is an illustrative view showing a preview display when a new document image has been inserted into a position lateral to a reference document image in the preview representation.

Switching mode selecting button 1320 is displayed on the copy mode display screen in touch panel display 130, as shown in FIG. 9. When a new document image is inserted into a preview image P10 being displayed, "page insert mode" is selected by switching mode selecting button 1320.

In example 1, preview image P10 on touch panel display 130 is displayed so that document images P11, P12 and P13 are laid out in the lateral direction from left to right on touch panel display 130, as shown in FIG. 10A.

At this point, when a new document image is inserted into preview image P10, the user designates a position (commanded position) into which a new document image should be inserted, by the fingertip as shown in FIG. 10A so that the new document image is inserted into that position.

In example 1, when, in preview image P10, document image P12 is designated as the reference document image, the user touches the left side of reference document image P12 with the fingertip as shown in FIG. 10A so as to designate the touched position as the commanded position into which a new document image P14 should be inserted.

As a result, by the function of document image insertion controller 1314, new document image P14 is inserted into a position at the left side of reference document image P12, or between the reference document image and document image P11 in preview image P10, as shown in FIG. 10B.

At this timing, when user touches touch panel 134, preview layout direction switching controller 1312 switches the layout direction (the lineup direction of document images P11, P12 and P13) in preview image P10, in accordance with the commanded position (detected commanded position) detected by commanded position detecting controller 1311.

In example 1, since the detected commanded position relative to reference document image P12 is located in the lateral direction, i.e., the same direction as the layout direction in preview image P10 currently being displayed, the layout direction in preview image P10 remains the lateral direction.

At the same time, scroll direction switching controller 1313 switches the direction of scrolling preview image P10 in accordance with the detected commanded position.

In example 1, since the detected commanded position relative to reference document image P12 is located in the lateral direction, i.e., the same direction as the layout direction in preview image P10 currently being displayed, the scrolling direction in preview image P10 is set in the lateral direction.

In this way, preview image P10 is displayed such that newly inserted document image P14 and reference document image P12 are laid out side by side in the lateral direction (in the direction of arrow A in the drawing) while the scrolling direction in preview image P10 is set laterally or in the same direction as the preview layout direction.

Example 2

Example 2 is a variation of example 1 and shows a case where a new document image is inserted to a lateral position, on the opposite side to that in example 1, of the preview display of multiple document images laid out in the lateral direction (left-and-right direction) on display panel 132 on touch panel display 130.

Figure 11A:
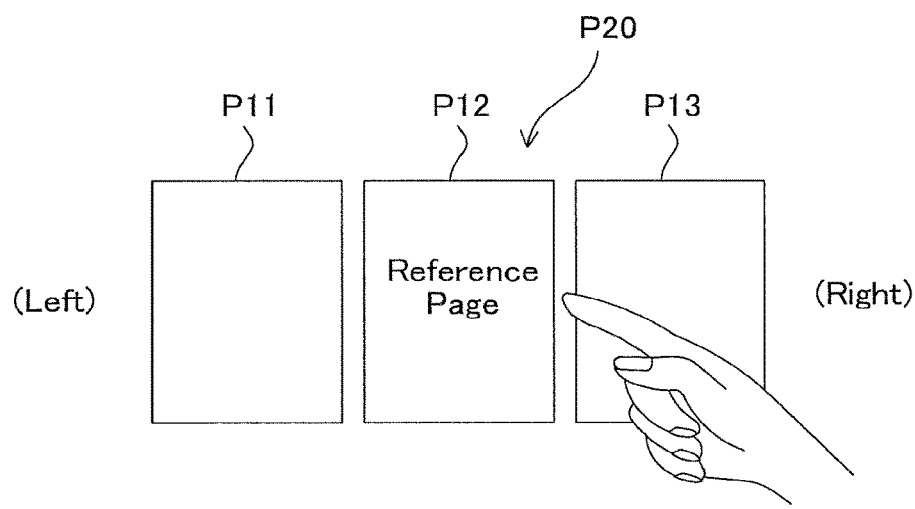
FIG. 11A is an illustrative view showing a state where document images are laid out in the lateral direction and displayed in a preview representation on a touch panel display of an image forming apparatus of example 2 of the present embodiment.
Figure 11B:
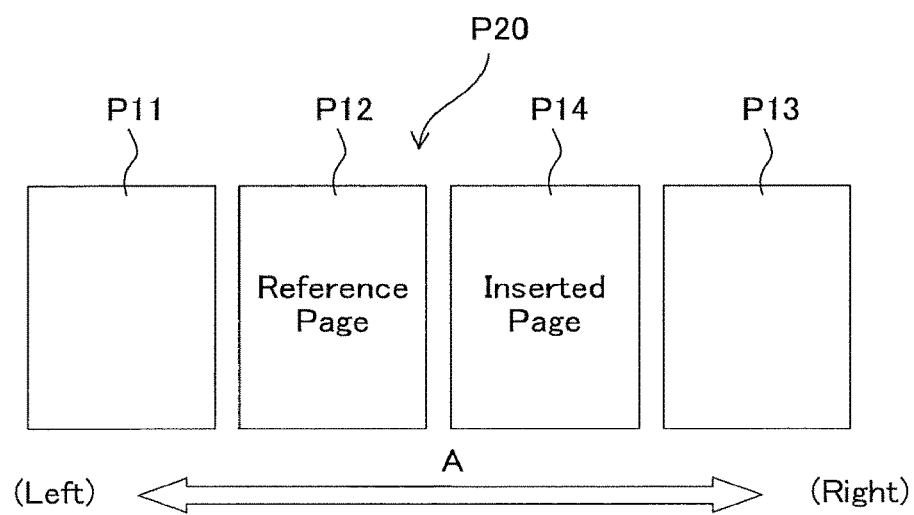
FIG. 11B is an illustrative view showing a preview display when a new document image has been inserted into a position lateral to a reference document image in the preview display.

FIG. 11A is an illustrative view showing a state where multiple document images are laid out in the lateral direction and displayed in a preview representation on the touch panel display of example 2. FIG. 11B is an illustrative view showing a preview display when a new document image has been inserted into a position lateral to a reference document image in the preview representation.

In example 2, when, in preview image P20, document image P12 is designated as the reference document image, the user touches the right side of document image P12 with the fingertip as shown in FIG. 11A so as to designate the touched position as the commanded position into which a new document image P14 should be inserted.

As a result, by the function of document image insertion controller 1314, new document image P14 is inserted into a position at the right side of reference document image P12, or between the reference document image and document image P13 in preview image P20, as shown in FIG. 11B.

In example 2, preview image P20 is displayed such that newly inserted document image P14 and reference document image P12 are laid out side by side in the lateral direction (in the direction of arrow A in the drawing) while the scrolling direction in preview image P20 is set laterally or in the same direction as the preview layout direction.

Example 3

Example 3 shows a case where a new document image is inserted into the preview display of document images being laid out and displayed in the lateral direction (left-and-right direction) on display panel 132, at a position located in the vertical direction (the top-and-bottom direction) on touch panel display 130.

Figure 12A:
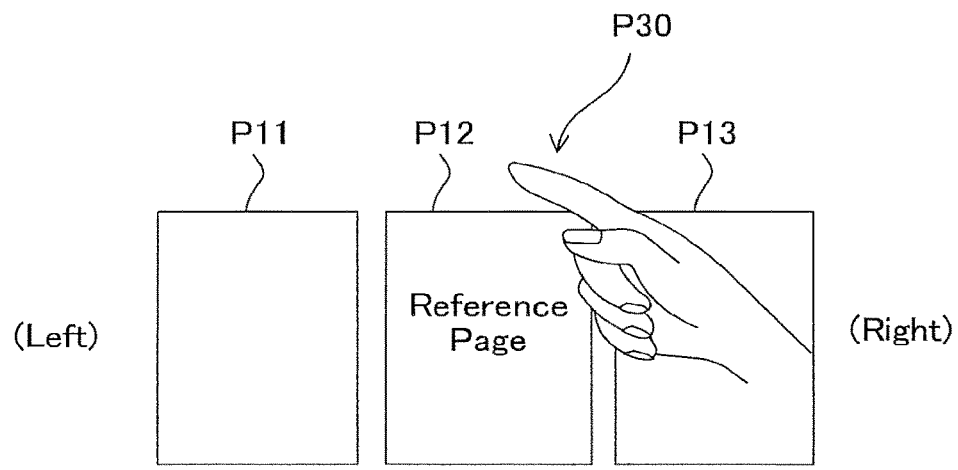
FIG. 12A is an illustrative view showing a state where document images are laid out in the lateral direction and displayed in a preview representation on a touch panel display of an image forming apparatus of example 3 of the present embodiment.
Figure 12B:
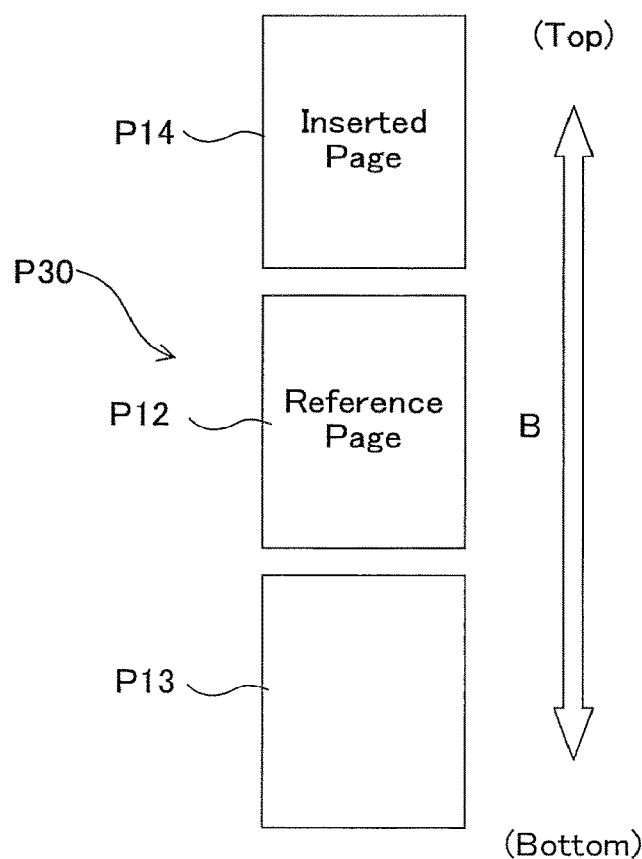
FIG. 12B is an illustrative view showing a preview display when a new document image has been inserted into a position vertical to a reference document image in the preview display.

FIG. 12A is an illustrative view showing a state where multiple document images are laid out in the lateral direction and displayed in a preview representation on the touch panel display of example 3. FIG. 12B is an illustrative view showing a preview display when a new document image has been inserted into a position vertical to a reference document image in the preview representation.

In example 3, preview image P30 is displayed on touch panel display 130 so that document images P11, P12 and P13 are laid out in the lateral direction from left to right on touch panel display 130, as shown in FIG. 12A.

At this point, when a new document image is inserted into preview image P30, the user designates a position (commanded position) into which a new document image should be inserted, by the fingertip as shown in FIG. 12A so that the new document image is inserted into that position.

In example 3, when, in preview image P30, document image P12 is designated as the reference document image, the user touches the upper side of reference document image P12 with the fingertip as shown in FIG. 12A so as to designate the touched position as the commanded position into which a new document image P14 should be inserted.

As a result, by the function of document image insertion controller 1314, new document image P14 is inserted into a position at the upper side of reference document image P12 in preview image P30, as shown in FIG. 12B.

At this timing, when user touches touch panel 134, preview layout direction switching controller 1312 switches the layout direction (the lineup direction of document images P11, P12 and P13) in preview image P30, in accordance with the commanded position (detected commanded position) detected by commanded position detecting controller 1311.

In example 3, since the detected commanded position relative to reference document image P12 is located in the vertical direction, the layout direction in preview image P30 is switched to the vertical direction.

At the same time, scroll direction switching controller 1313 switches the direction of scrolling preview image P30 in accordance with the detected commanded position.

In example 3, since the detected commanded position relative to reference document image P12 is located in the vertical direction, the scrolling direction in preview image P30 is switched to the vertical direction.

In this way, preview image P30 is displayed such that newly inserted document image P14 and reference document image P12 are lined in the vertical direction (in the direction of arrow B in the drawing) while the scrolling direction in preview image P30 is also directed vertically or in the same direction as the preview layout direction.

Example 4

Example 4 is a variation of example 3 and shows a case where a new document image is inserted to a vertical position (located in the top-and-bottom direction), on the opposite side to that in example 3, of the preview display of multiple document images laid out in the lateral direction (left-and-right direction) on display panel 132.

Figure 13A:
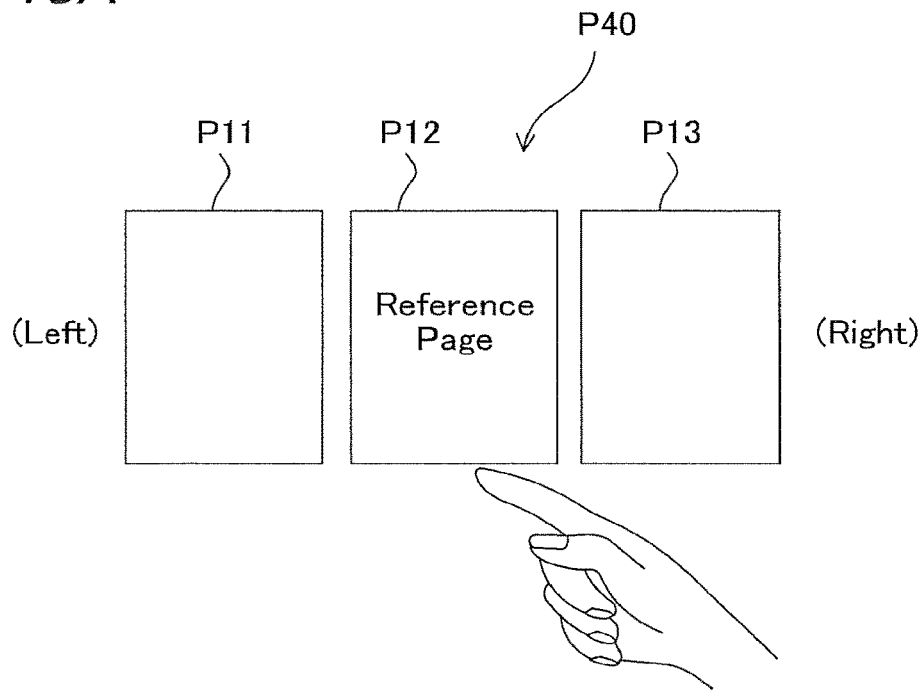
FIG. 13A is an illustrative view showing a state where document images are laid out in the lateral direction and displayed in a preview representation on a touch panel display of an image forming apparatus of example 4 of the present embodiment.
Figure 13B:
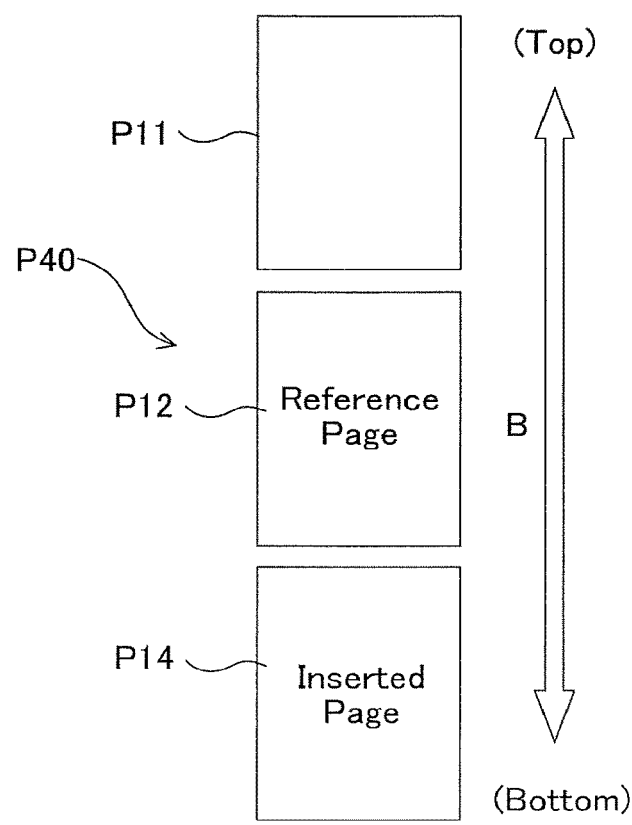
FIG. 13B is an illustrative view showing a preview display when a new document image has been inserted into a position vertical to a reference document image in the preview display.

FIG. 13A is an illustrative view showing a state where multiple document images are laid out in the lateral direction and displayed in a preview representation on the touch panel display. FIG. 13B is an illustrative view showing a preview display when a new document image has been inserted into a position vertical to a reference document image in the preview representation.

In example 4, when, in preview image P40, document image P12 is designated as the reference document image, the user touches the lower side of document image P12 with the fingertip as shown in FIG. 13A so as to designate the touched position as the commanded position into which a new document image P14 should be inserted.

As a result, by the function of document image insertion controller 1314, new document image P14 is inserted into a position at the lower side of reference document image P12 in preview image P40, as shown in FIG. 13B.

In example 4, preview image P40 is displayed such that newly inserted document image P14 and reference document image P12 are lined in the vertical direction (in the direction of arrow B in the drawing) while the scrolling direction in preview image P40 is set vertically or in the same direction as the preview layout direction.

Example 5

Example 5 shows a case where a new document image is inserted into the preview display of document images being lined and displayed in the vertical direction (top-and-bottom direction) on display panel 132, at a position located in the vertical direction on touch panel display 130.

Figure 14B:
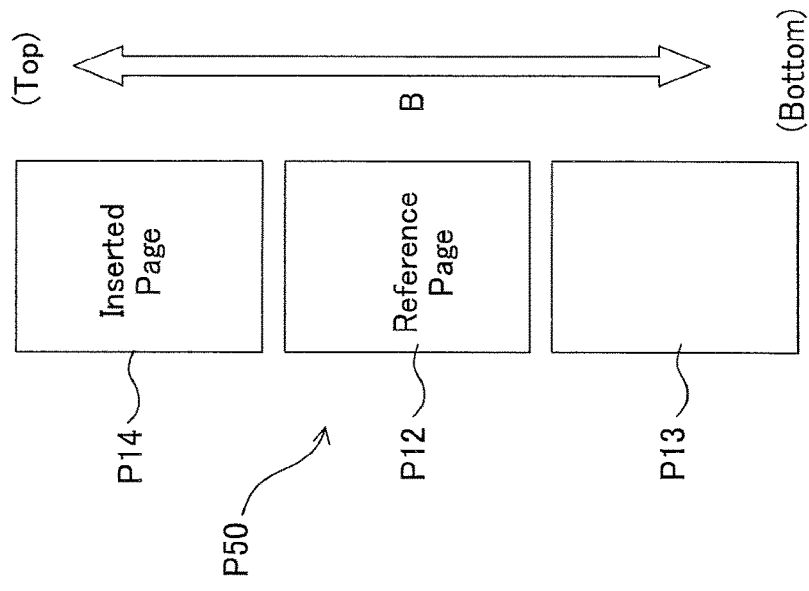
FIG. 14B is an illustrative view showing a preview display when a new document image has been inserted into a position vertical to a reference document image in the preview display.
Figure 14A:
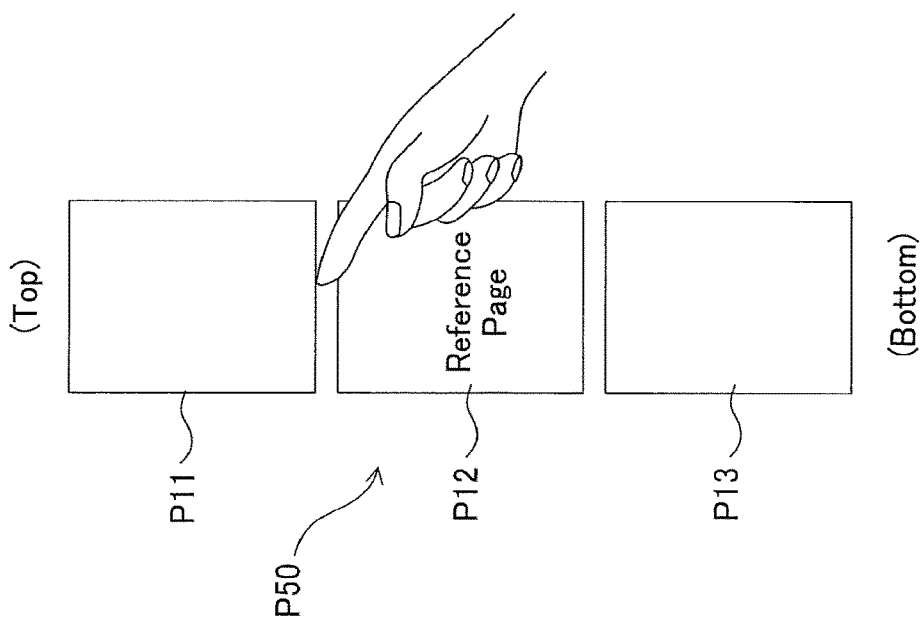
FIG. 14A is an illustrative view showing a state where document images are laid out and displayed in the vertical direction in a preview representation on a touch panel display of an image forming apparatus of example 5 of the present embodiment.

FIG. 14A is an illustrative view showing a state where multiple document images are lined in the vertical direction and displayed in a preview representation on the touch panel display of example 5. FIG. 14B is an illustrative view showing a preview display when a new document image has been inserted into a position vertical to a reference document image in the preview representation.

In example 5, preview image P50 is displayed on touch panel display 130 so that document images P11, P12 and P13 are lined in the vertical direction from the top to bottom on touch panel display 130, as shown in FIG. 14A.

At this point, when a new document image is inserted into preview image P50, the user designates a position (commanded position) into which a new document image should be inserted, by the fingertip as shown in FIG. 14A so that the new document image is inserted into that position.

In example 5, when, in preview image P50, document image P12 is designated as the reference document image, the user touches the upper side of reference document image P12 with the fingertip as shown in FIG. 14A so as to designate the touched position as the commanded position into which a new document image P14 should be inserted.

As a result, by the function of document image insertion controller 1314, new document image P14 is inserted into a position at the upper side of reference document image P12 in preview image P50, as shown in FIG. 14B.

At this timing, when user touches touch panel 134, preview layout direction switching controller 1312 switches the layout direction (the lineup direction of document images P11, P12 and P13) in preview image P50, in accordance with the commanded position (detected commanded position) detected by commanded position detecting controller 1311.

In example 5, since the detected commanded position relative to reference document image P12 is located in the vertical direction, i.e., the same direction as the layout direction in preview image P50 currently being displayed, the layout direction in preview image P50 remains the vertical direction.

At the same time, scroll direction switching controller 1313 switches the direction of scrolling preview image P50 in accordance with the detected commanded position.

In example 5, since the detected commanded position relative to reference document image P12 is located in the vertical direction, i.e., the same direction as the layout direction in preview image P50 currently being displayed, the scrolling direction in preview image P50 is set in the vertical direction.

In this way, preview image P50 is displayed such that newly inserted document image P14 and reference document image P12 are lined in the vertical direction (in the direction of arrow B in the drawing) while the scrolling direction in preview image P50 is also directed vertically or in the same direction as the preview layout direction.

Example 6

Example 6 is a variation of example 5 and shows a case where a new document image is inserted to a vertical position, on the opposite side to that in example 5, of the preview display of multiple document images lined in the vertical direction (top-and-bottom direction) on display panel 132.

Figure 15B:
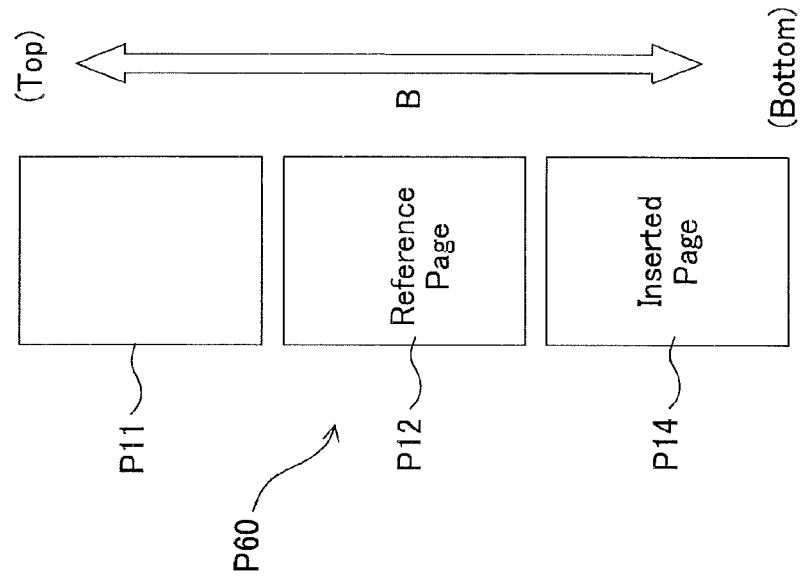
FIG. 15B is an illustrative view showing a preview display when a new document image has been inserted into a position vertical to a reference document image in the preview display.
Figure 15A:
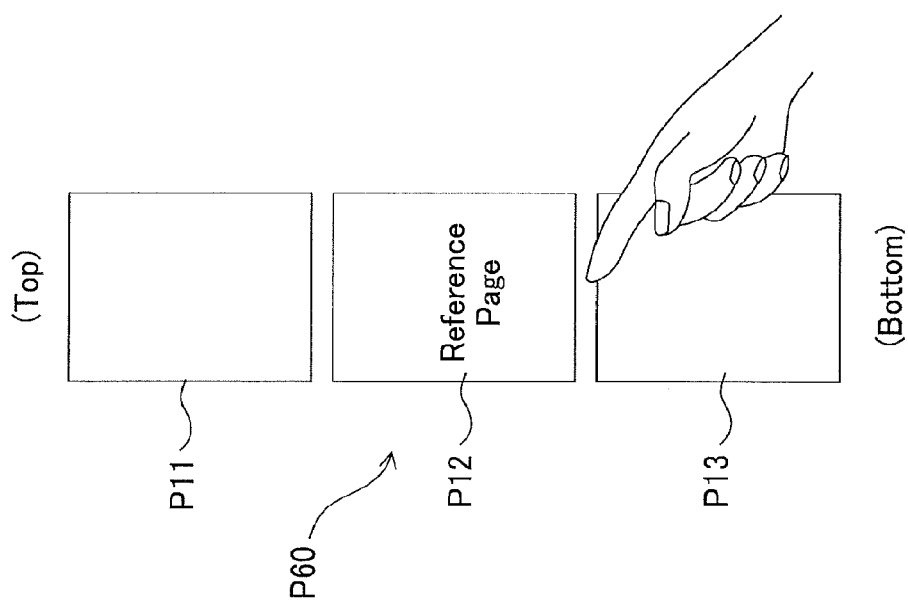
FIG. 15A is an illustrative view showing a state where document images are laid out and displayed in the vertical direction in a preview representation on a touch panel display of an image forming apparatus of example 6 of the present embodiment.

FIG. 15A is an illustrative view showing a state where multiple document images are lined in the vertical direction and displayed in a preview representation on the touch panel display. FIG. 15B is an illustrative view showing a preview display when a new document image has been inserted into a position vertical to a reference document image in the preview representation.

In example 6, when, in preview image P60, document image P12 is designated as the reference document image, the user touches the lower side of document image P12 with the fingertip as shown in FIG. 15A so as to designate the touched position as the commanded position into which a new document image P14 should be inserted.

As a result, by the function of document image insertion controller 1314, new document image P14 is inserted into a position at the lower side of reference document image P12 in preview image P60, as shown in FIG. 15B.

In example 6, preview image P60 is displayed such that newly inserted document image P14 and reference document image P12 are lined in the vertical direction (in the direction of arrow B in the drawing) while the scrolling direction in preview image P60 is set vertically or in the same direction as the preview layout direction.

Example 7

Example 7 shows a case where a new document image is inserted into the preview display of document images being lined and displayed in the vertical direction (top-and-bottom direction) on display panel 132, at a position located in the lateral direction (left-and-right direction).

Figure 16B:
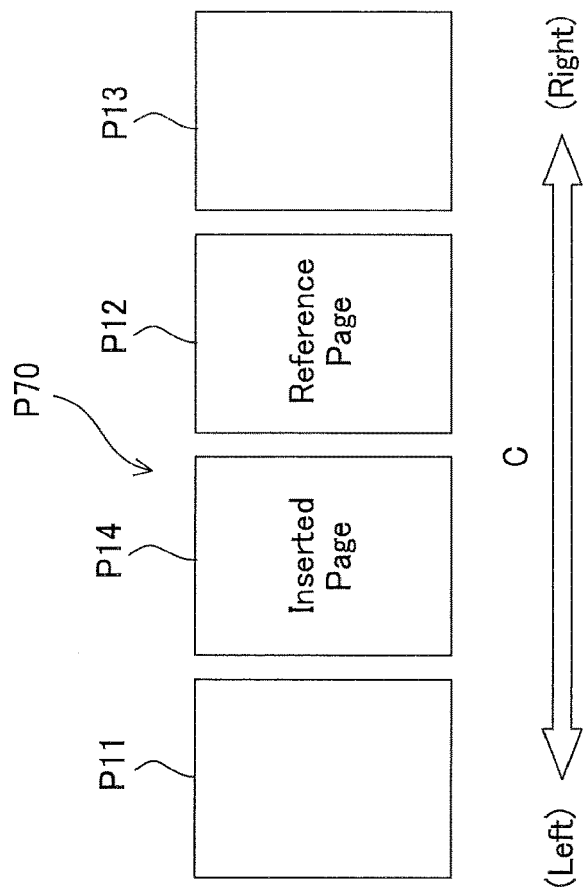
FIG. 16B is an illustrative view showing a preview display when a new document image has been inserted into a position lateral to a reference document image in the preview display.
Figure 16A:
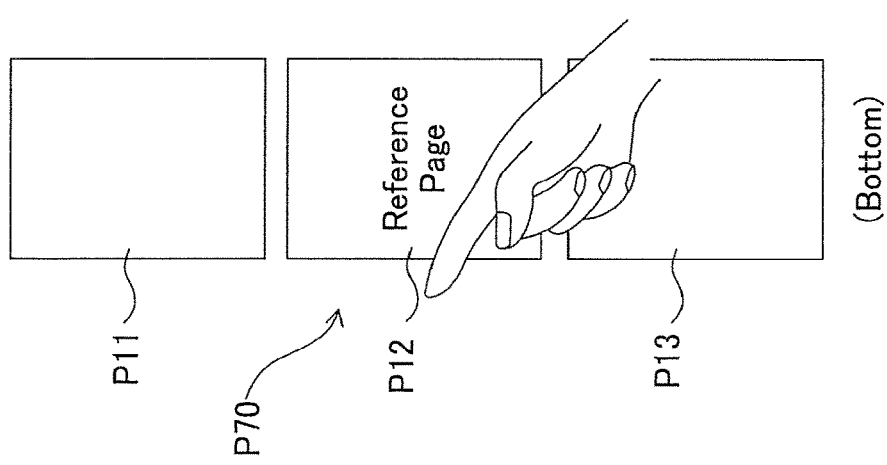
FIG. 16A is an illustrative view showing a state where document images are laid out and displayed in the vertical direction in a preview representation on a touch panel display of an image forming apparatus of example 7 of the present embodiment.

FIG. 16A is an illustrative view showing a state where multiple document images are lined in the vertical direction and displayed in a preview representation on the touch panel display of example 7. FIG. 16B is an illustrative view showing a preview display when a new document image has been inserted into a position lateral to a reference document image in the preview representation.

In example 7, preview image P70 is displayed on touch panel display 130 so that document images P11, P12 and P13 are lined in the vertical direction from the top to bottom on touch panel display 130, as shown in FIG. 16A.

At this point, when a new document image is inserted into preview image P70, the user designates a position (commanded position) into which a new document image should be inserted, by the fingertip as shown in FIG. 16A so that the new document image is inserted into that position.

In example 7, when, in preview image P70, document image P12 is designated as the reference document image, the user touches the left side of reference document image P12 with the fingertip as shown in FIG. 16A so as to designate the touched position as the commanded position into which a new document image P14 should be inserted.

As a result, by the function of document image insertion controller 1314, new document image P14 is inserted into a position at the left of reference document image P12 in preview image P70, as shown in FIG. 16B.

At this timing, when user touches touch panel 134, preview layout direction switching controller 1312 switches the layout direction (the lineup direction of document images P11, P12 and P13) in preview image P70, in accordance with the commanded position (detected commanded position) detected by commanded position detecting controller 1311.

In example 7, since the detected commanded position relative to reference document image P12 is located in the lateral direction, the layout direction in preview image P70 is switched to the lateral direction.

At the same time, scroll direction switching controller 1313 switches the direction of scrolling preview image P70 in accordance with the detected commanded position.

In example 7, since the detected commanded position relative to reference document image P12 is located in the lateral direction, the scrolling direction in preview image P70 is switched to the lateral direction.

In this way, preview image P70 is displayed such that newly inserted document image P14 and reference document image P12 are laid out in the lateral direction (in the direction of arrow C in the drawing) while the scrolling direction in preview image P70 is also directed laterally or in the same direction as the preview layout direction.

Example 8

Example 8 is a variation of example 7 and shows a case where a new document image is inserted to a lateral position (located in the left-and-right direction), on the opposite side to that in example 7, of the preview display of multiple document images lined in the vertical direction (top-and-bottom direction) on display panel 132.

Figure 17B:
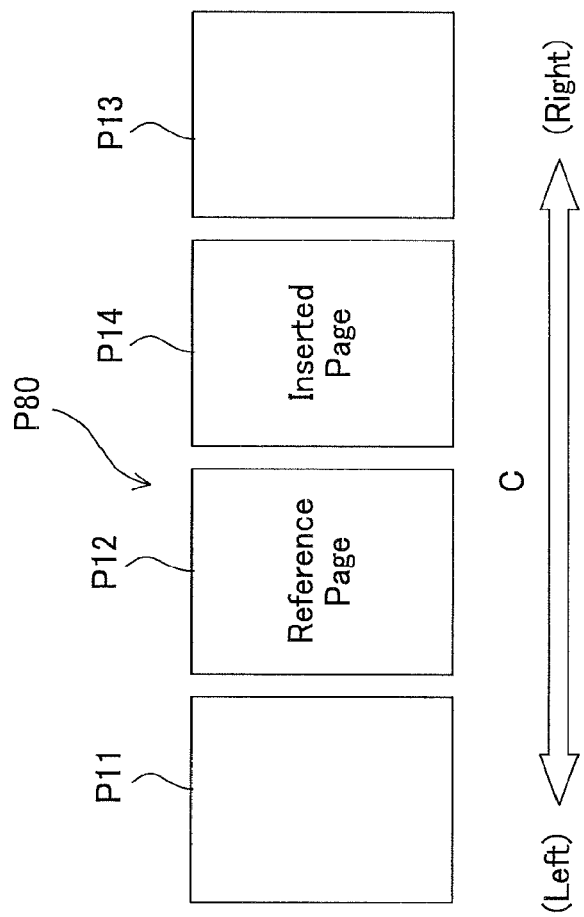
FIG. 17B is an illustrative view showing a preview display when a new document image has been inserted into a position lateral to a reference document image in the preview display.
Figure 17A:
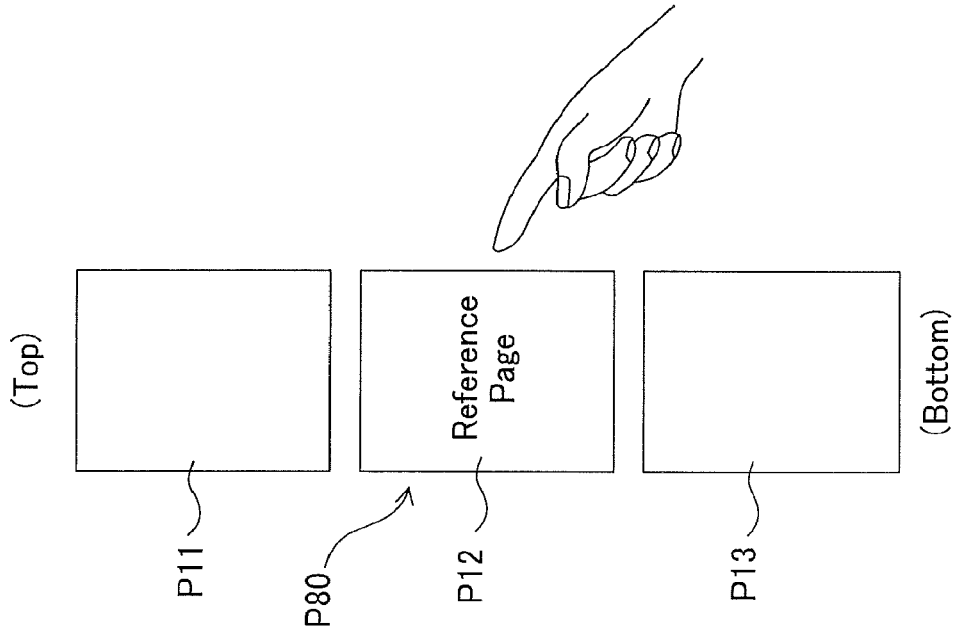
FIG. 17A is an illustrative view showing a state where document images are laid out and displayed in the vertical direction in a preview representation on a touch panel display of an image forming apparatus of example 8 of the present embodiment.

FIG. 17A is an illustrative view showing a state where multiple document images are lined in the vertical direction and displayed in a preview representation on the touch panel display. FIG. 17B is an illustrative view showing a preview display when a new document image has been inserted into a position lateral to a reference document image in the preview representation.

In example 8, when, in preview image P80, document image P12 is designated as the reference document image, the user touches the right side of document image P12 with the fingertip as shown in FIG. 17A so as to designate the touched position as the commanded position into which a new document image P14 should be inserted.

As a result, by the function of document image insertion controller 1314, new document image P14 is inserted into a position at the right side of reference document image P12 in preview image P80, as shown in FIG. 17B.

In example 8, preview image P80 is displayed such that newly inserted document image P14 and reference document image P12 are laid out in the lateral direction (in the direction of arrow C in the drawing) while the scrolling direction in preview image P80 is set laterally or in the same direction as the preview layout direction.

Example 9

Example 9 shows a case where a document image selected from multiple document images that are laid out in the lateral direction (left-and-right direction) and given in preview representation on display panel 132, is moved to a lateral position along the layout direction in the preview display.

Figure 18A:
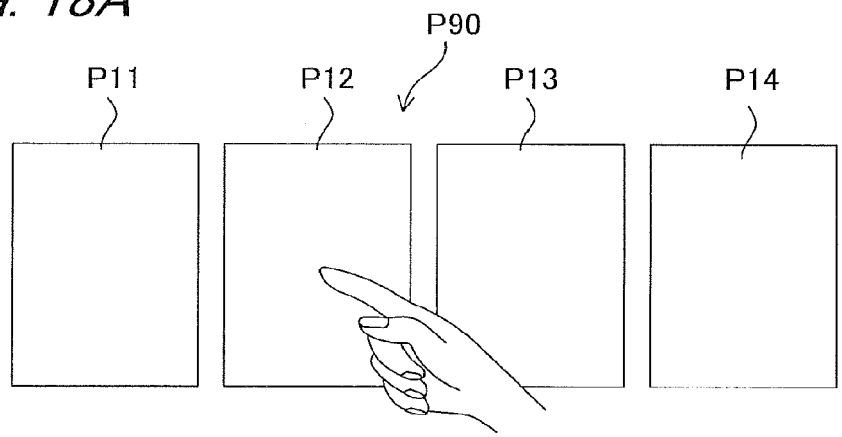
FIG. 18A is an illustrative view showing a state where document images are laid out in the lateral direction and displayed in a preview representation on a touch panel display of an image forming apparatus of example 9 of the present embodiment.
Figure 18B:
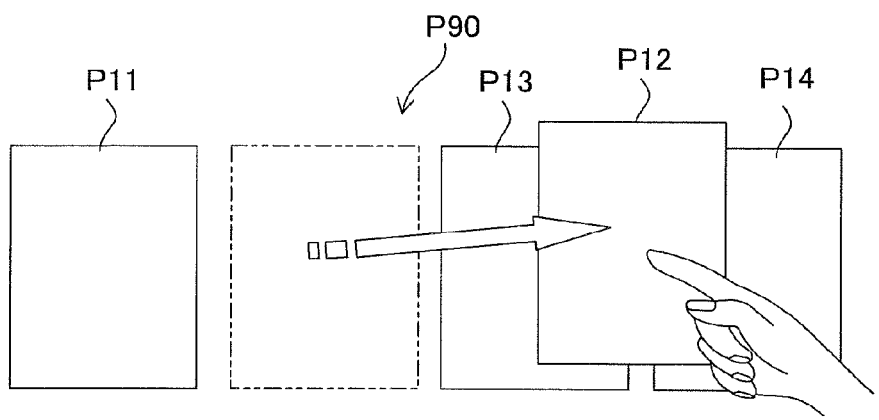
FIG. 18B is an illustrative view showing a state where a selected document image is moved to a position lateral to a reference document image in the preview display.
Figure 18C:
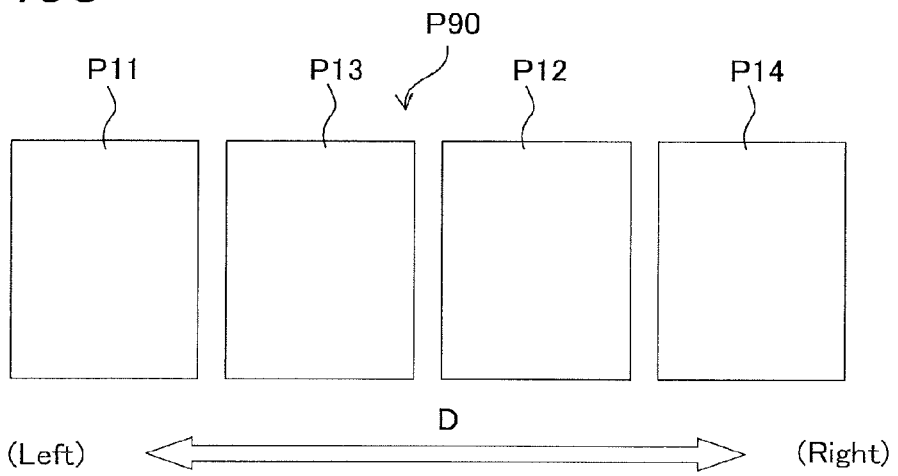
FIG. 18C is an illustrative view showing a preview display when the selected document image has been moved to a position lateral to the reference document image in the preview display.

FIG. 18A is an illustrative view showing a state where multiple document images are laid out in the lateral direction and displayed in a preview representation on the touch panel display of example 9. FIG. 18B is an illustrative view showing a state where a selected image is moved to a position lateral to a reference document image in the preview representation. FIG. 18C is an illustrative view showing a preview display when the selected document image has been moved to a position lateral to the reference document image in the preview representation.

In example 9, preview image P90 is displayed on touch panel display 130 so that document images P11, P12, P13 and P14 are laid out in the lateral direction from left to right on touch panel display 130, as shown in FIG. 18A.

At this point, when a document image selected from multiple document images that are given in preview representation, is moved inside preview image P90, the user touches and selects the document image to be moved in preview image P90 by the fingertip as shown in FIG. 18A so that the selected document image is slid to the position (commanded position), as shown in FIG. 18B.

In example 9, when, in preview image P90, document image P14 is designated as the reference document image, the user touches the left side of reference document image P14 with the fingertip so that the selected document image P12 moves to the touched position indicated as the commanded position to which selected document image P12 should be moved, as shown in FIGS. 18A and 18B.

As a result, by the function of document image movement controller 1315, document image P12 is moved to a position at the left side of reference document image P14, or between the reference document image and document image P13 in preview image P90, as shown in FIG. 18C.

At this timing, when user touches touch panel 134 to move document image P12, preview layout direction switching controller 1312 switches the layout direction (the lineup direction of document images P11, P12, P13 and P14) in preview image P90, in accordance with the commanded position (detected commanded position) detected by commanded position detecting controller 1311.

In example 9, since the detected commanded position relative to reference document image P14 is located in the lateral direction, i.e., the same direction as the layout direction in preview image P90 currently being displayed, the layout direction in preview image P90 remains the lateral direction.

At the same time, scroll direction switching controller 1313 switches the direction of scrolling preview image P90, in accordance with the detected commanded position.

In example 9, since the commanded position relative to reference document image P14 is located in the lateral direction, i.e., the same direction as the layout direction in preview image P90 currently being displayed, the scrolling direction in preview image P90 is set in the lateral direction.

In this way, preview image P90 is displayed such that moved document image P12 and reference document image P14 are laid out side by side in the lateral direction (in the direction of arrow D in the drawing) while the scrolling direction in preview image P90 is set laterally or in the same direction as the preview layout direction, as shown in FIG. 18C.

Example 10

Example 10 is a variation of example 9 and shows a case where a document image selected from multiple document images that are laid out in the lateral direction (left-and-right direction) and given in preview representation on display panel 132, is inserted to a lateral position on the opposite side to that in example 9, along the layout direction in the preview display.

Figure 19A:
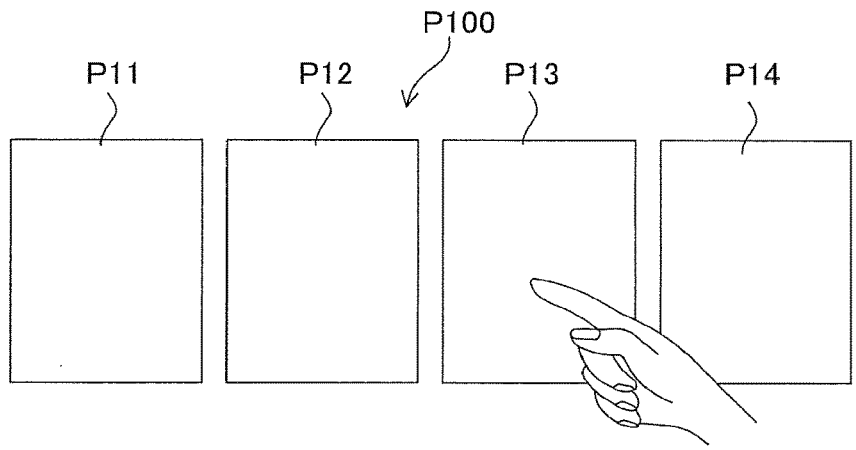
FIG. 19A is an illustrative view showing a state where document images are laid out in the lateral direction and displayed in a preview representation on a touch panel display of an image forming apparatus of example 10 of the present embodiment.
Figure 19B:
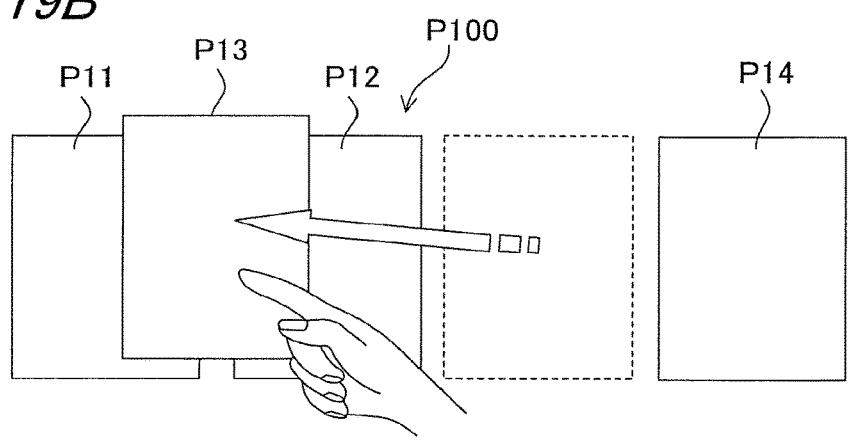
FIG. 19B is an illustrative view showing a state where a selected document image is moved to a position lateral to a reference document image in the preview display.
Figure 19C:
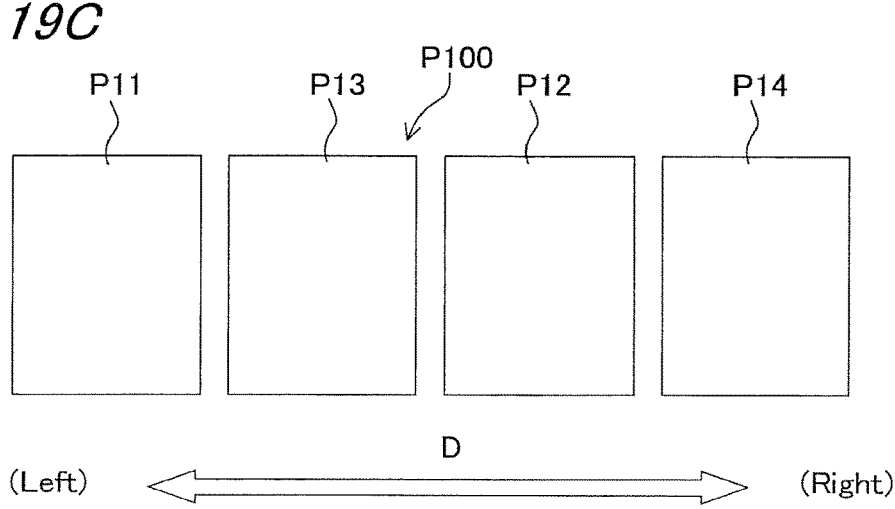
FIG. 19C is an illustrative view showing a preview display when the selected document image has been moved to a position lateral to the reference document image in the preview display.

FIG. 19A is an illustrative view showing a state where multiple document images are laid out in the lateral direction and displayed in a preview representation on the touch panel display of example 10. FIG. 19B is an illustrative view showing a state where a selected document image is moved to a position lateral to a reference document image in the preview display. FIG. 19C is an illustrative view showing a preview display when the selected document image has been moved to a position lateral to the reference document image in the preview display.

In example 10, when, in preview image P100, document image P11 is designated as the reference document image, the user touches the right side of reference document image P11 with the fingertip so as to move the selected document image P13 to the touched position indicated as the commanded position to which selected document image P13 should be moved, as shown in FIGS. 19A and 19B.

As a result, by the function of document image movement controller 1315, document image P13 is moved to a position at the right side of reference document image P11, or between the reference document image and document image P12 in preview image P100, as shown in FIG. 19C.

In example 10, preview image P100 is displayed such that moved document image P13 and reference document image P11 are laid out side by side in the lateral direction (in the direction of arrow D in the drawing) while the scrolling direction in preview image P100 is set laterally or in the same direction as the preview layout direction, as shown in FIG. 19C.

Example 11

Example 11 shows a case where a document image selected from multiple document images that are laid out in the lateral direction (left-and-right direction) and given in preview representation on display panel 132, is moved to a vertical position (located in the top-and-bottom direction) with respect to the layout direction in the preview display.

Figure 20A:
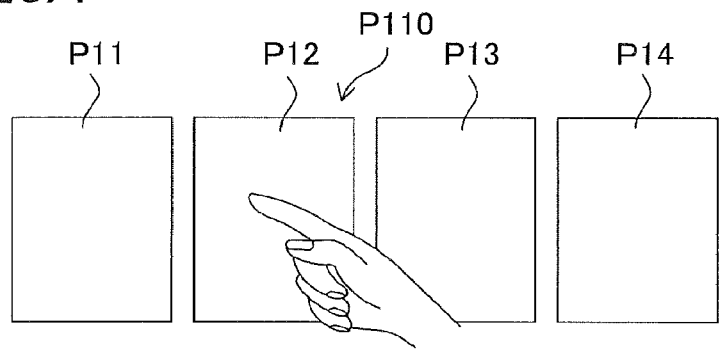
FIG. 20A is an illustrative view showing a state where document images are laid out in the lateral direction and displayed in a preview representation on a touch panel display of an image forming apparatus of example 11 of the present embodiment.
Figure 20B:
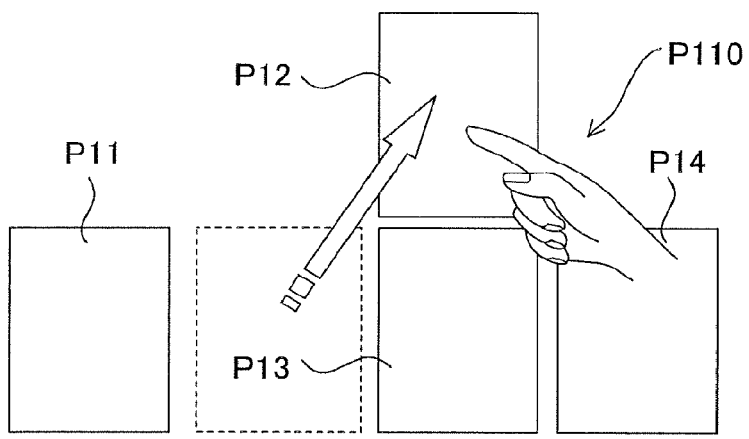
FIG. 20B is an illustrative view showing a state where a selected document image is moved to a position vertical to a reference document image in the preview display.
Figure 20C:
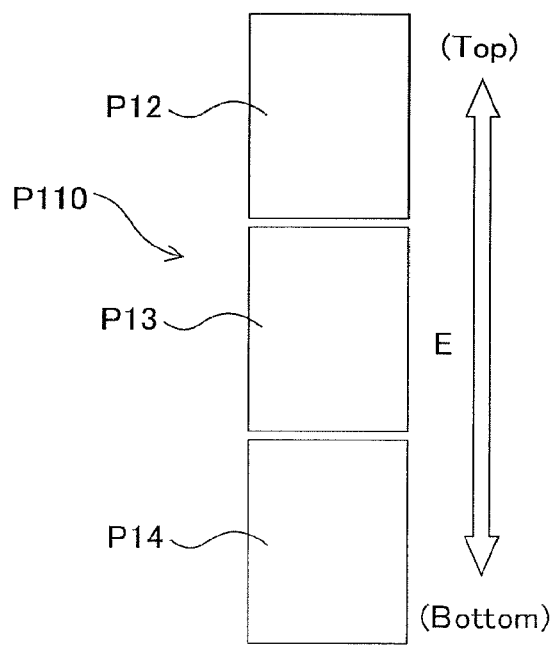
FIG. 20C is an illustrative view showing a preview display when the selected document image has been moved to a position vertical to the reference document image in the preview display.

FIG. 20A is an illustrative view showing a state where multiple document images are laid out in the lateral direction and displayed in a preview representation on the touch panel display of example 11. FIG. 20B is an illustrative view showing a state where a selected image is moved to a position vertical to a reference document image in the preview representation. FIG. 20C is an illustrative view showing a preview display when the selected document image has been moved to a position vertical to the reference document image in the preview representation.

In example 11, preview image P110 is displayed on touch panel display 130 so that document images P11, P12, P13 and P14 are laid out in the lateral direction from left to right on touch panel display 130, as shown in FIG. 20A.

At this point, when a document image selected from multiple document images that are given in preview representation, is moved inside preview image P110, the user touches and selects the document image to be moved in preview image P110 by the fingertip as shown in FIG. 20A so that the selected document image is slid to the position (commanded position), as shown in FIG. 20B.

In example 11, when, in preview image P110, document image P13 is designated as the reference document image, the user touches the upper side of reference document image P13 with the fingertip so that the selected document image P12 moves to the touched position indicated as the commanded position to which selected document image P12 should be moved, as shown in FIGS. 20A and 20B.

As a result, by the function of document image movement controller 1315, document image P12 is moved to a position at the upper side of reference document image P13 in preview image 110, as shown in FIG. 20C.

At this timing, when user touches touch panel 134 to move document image P12, preview layout direction switching controller 1312 switches the layout direction (the lineup direction of document images P11, P12, P13 and P14) in preview image P110, in accordance with the commanded position (detected commanded position) detected by commanded position detecting controller 1311.

In example 11, since the detected commanded position relative to reference document image P13 is located in the vertical direction, the layout direction in preview image P110 is switched to the vertical direction.

At the same time, scroll direction switching controller 1313 switches the direction of scrolling preview image P110, in accordance with the detected commanded position.

In example 11, since the commanded position relative to reference document image P13 is located in the vertical direction, the scrolling direction in preview image P110 is switched to the vertical direction.

In this way, preview image P110 is displayed such that moved document image P12 and reference document image P13 are lined in the vertical direction (in the direction of arrow E in the drawing) while the scrolling direction in preview image P110 is set vertically or in the same direction as the preview layout direction, as shown in FIG. 20C.

Example 12

Example 12 is a variation of example 11 and shows a case where a document image selected from multiple document images that are laid out in the lateral direction (left-and-right direction) and given in preview representation on display panel 132, is inserted to a vertical position on the opposite side to that in example 11, along the layout direction in the preview display.

Figure 21A:
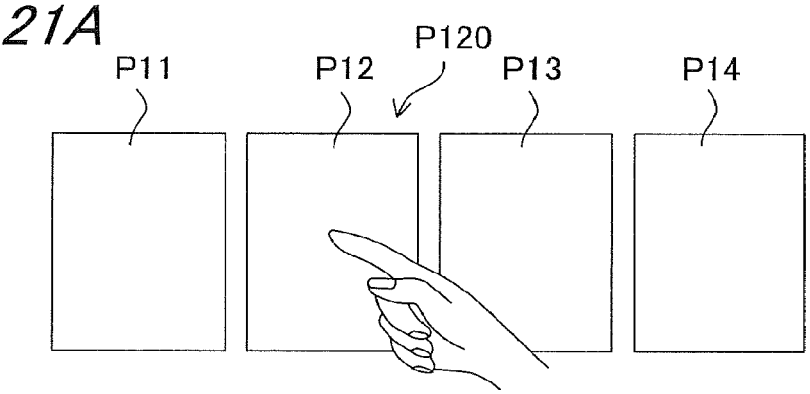
FIG. 21A is an illustrative view showing a state where document images are laid out in the lateral direction and displayed in a preview representation on a touch panel display of an image forming apparatus of example 12 of the present embodiment.
Figure 21B:
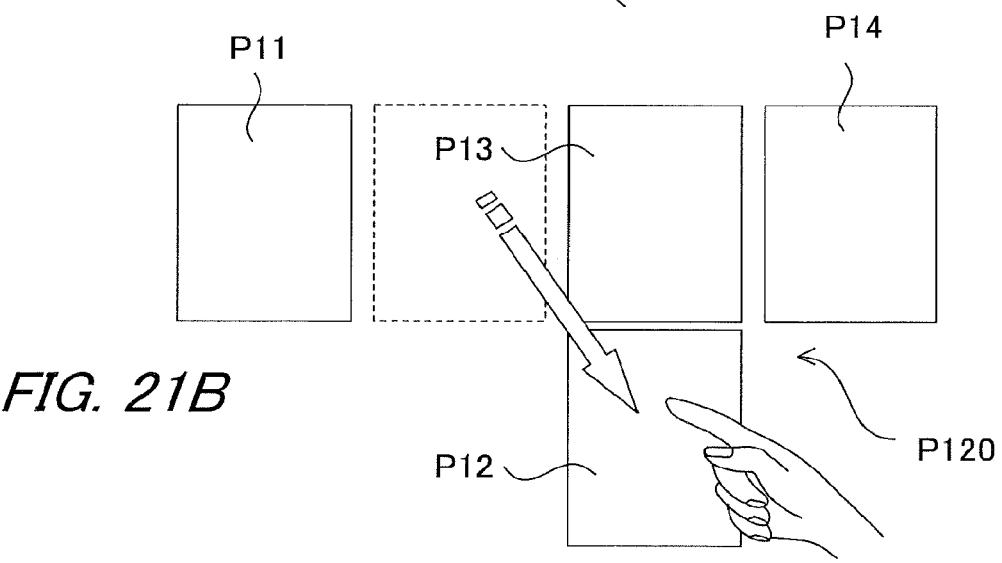
FIG. 21B is an illustrative view showing a state where a selected document image is moved to a position vertical to a reference document image in the preview display.
Figure 21C:
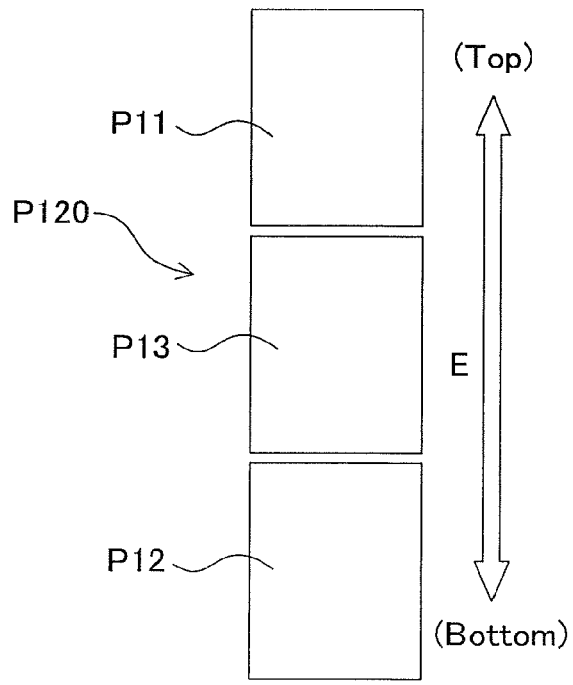
FIG. 21C is an illustrative view showing a preview display when the selected document image has been moved to a position vertical to the reference document image in the preview display.

FIG. 21A is an illustrative view showing a state where multiple document images are laid out in the lateral direction and displayed in a preview representation on the touch panel display of example 12. FIG. 21B is an illustrative view showing a state where a selected document image is moved to a position vertical to a reference document image in the preview display. FIG. 21C is an illustrative view showing a preview display when the selected document image has been moved to a position vertical to the reference document image in the preview display.

In example 12, when, in preview image P120, document image P13 is designated as the reference document image, the user touches the lower side of reference document image P13 with the fingertip so as to move the selected document image P12 to the touched position indicated as the commanded position to which selected document image P12 should be moved, as shown in FIGS. 21A and 21B.

As a result, by the function of document image movement controller 1315, document image P12 is moved to a position at the lower side of reference document image P13 in preview image P120, as shown in FIG. 21C.

In example 12, preview image P120 is displayed such that moved document image P12 and reference document image P13 are lined one over the other in the vertical direction (in the direction of arrow E in the drawing) while the scrolling direction in preview image P120 is set vertically or in the same direction as the preview layout direction, as shown in FIG. 21C.

Example 13

Example 13 shows a case where document images indicated with stapling positions (binding positions) in the upper part thereof are presented on touch panel display 130 in preview representation. In this example, the preview display with document images lined in the vertical direction (top-and-bottom direction) on display panel 132, is switched into a preview display with the document images laid out in the lateral direction, by moving one of the document images.

Figure 22B:
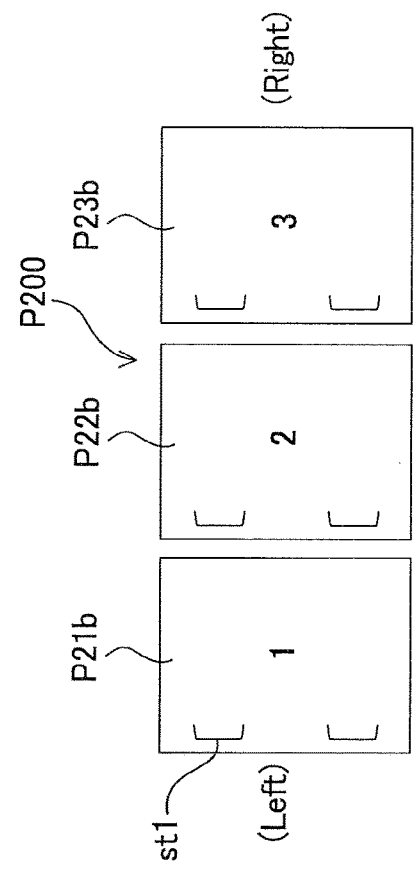
FIG. 22B is an illustrative view showing a preview display when the preview display on the touch panel display is switched to the lateral layout from right to left; and, FIG. 22C is an illustrative view showing a preview display when the preview display on the touch panel display is switched to the lateral layout from left to right.
Figure 22C:
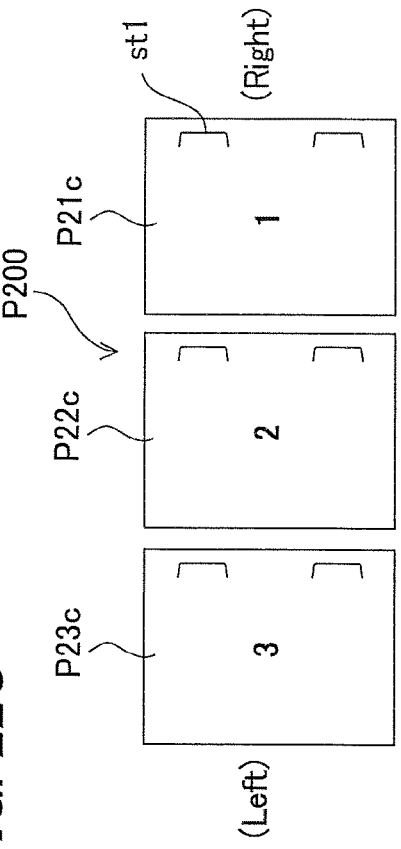
FIG. 22A is an illustrative view showing a preview display when document images with stapling positions set at the top are laid out in the vertical direction and displayed in a preview representation on a touch panel display of an image forming apparatus of example 13 of the present embodiment.
Figure 22A:
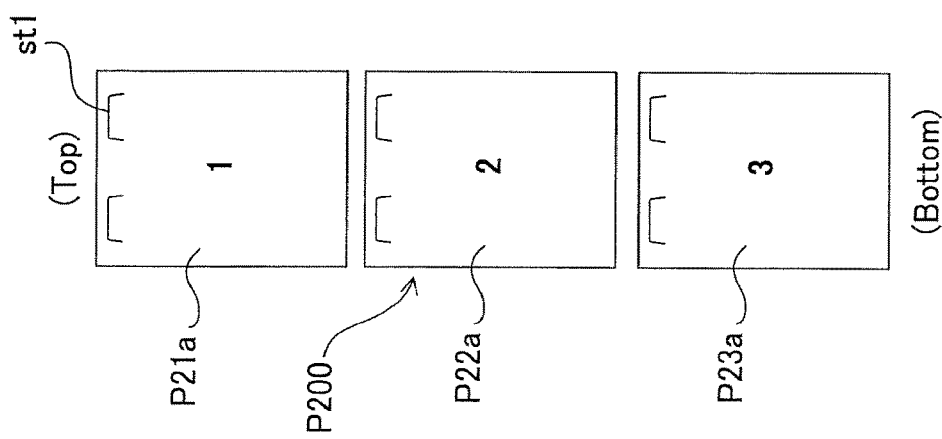

FIG. 22A is an illustrative view showing a preview display in which document images indicated with staple positions in the upper part thereof are lined in the vertical direction and displayed in a preview representation on the touch panel display of example 13. FIG. 22B is an illustrative view showing a preview display when the preview display on the touch panel display is switched to a preview of lateral layout from right to left. FIG. 22C is an illustrative view showing a preview display when the preview display on the touch panel display is switched to a preview of lateral layout from left to right.

In example 13, preview image P200 is displayed on touch panel display 130 so that document images P21a, P22a and P23a with staples st1 (binding positions) arranged in the upper part as a finishing process, are lined in the vertical direction from the top to bottom and given in a preview presentation on touch panel display 130, as shown in FIG. 22A.

In this case, when the layout direction in preview image P200 in FIG. 22A is switched to the lateral direction, the user selects a document image to be the reference in preview image P200 and touches one side in the left-and-right direction of the selected document image so as to designate the touched position as the commanded position, whereby the layout direction in the preview image can be switched in accordance with the commanded position in preview image 200.

In example 13, when, in preview image P200, document image P22a is designated as the reference document image, the user touches the left side of reference document image P22a with the fingertip as shown in FIG. 22A so as to designate the touched position as the commanded position, whereby preview image 200 displayed on touch panel display 130 is changed to that with its layout direction directed laterally from left to right, as shown in FIG. 22B.

At this timing, when user touches touch panel 134 to indicate a commanded position, preview layout direction switching controller 1312 switches the layout direction in preview image P200, in accordance with the commanded position (detected commanded position) detected by commanded position detecting controller 1311.

In example 13, since the detected commanded position relative to reference document image P22a is located in the lateral direction, the layout direction in preview image P200 is switched to the lateral direction.

At the same time, scroll direction switching controller 1313 switches the direction of scrolling preview image P200 in accordance with the detected commanded position.

In example 13, since the detected commanded position relative to reference document image P22a is located in the lateral direction, the scrolling direction in preview image P200 is switched to the lateral direction.

Further, in accordance with the detected commanded position, finishing process setup modification controller 1318 modifies the positions of staples st1 set in the finishing process.

In example 13, since the detected commanded position relative to reference document image P22a is located on the left side in the lateral direction, the positions of staples st1 in preview image P200 are changed to the left side so that the document images P21b, P22b and P23b, displayed on touch panel display 130, are laid out and given in a preview representation as shown in FIG. 22B.

In this way, preview image P200 is displayed such that document images are laid out in the direction of the commanded position relative to reference document image P22a, i.e., in the lateral direction while the scrolling direction in preview image P200 is also switched to the lateral direction or in the same direction as the preview layout direction and the positions of staples st1 are changed from the top to the left side in the lateral direction, as shown in FIG. 22B.

Further, when, in preview image P200, the right side of document image P22a is designated as the commanded position, and the user touches the commanded position with the fingertip, preview image P200 is changed so that document images P21c, P22c and P23c are laid out in the lateral direction from right to left, as shown in FIG. 22c, in accordance with the position of the commanded position relative to reference document image P22a while the scrolling direction in preview image P200 is switched to the lateral direction or in the same direction as the preview layout direction and the positions of staples st1 are changed from the top to the right side in the lateral direction.

Though, in example 13, the preview layout direction, scrolling direction and positions of staples in the preview image are changed based on the commanded position to which a document image in preview image P200 is moved, the preview layout direction, scrolling direction and positions of staples in the preview image may be changed based on the commanded position into which a new document image is inserted.

As has been described heretofore, according to the present embodiment, since image forming apparatus 100 includes, as controller 131 for touch panel display 130, commanded position detecting controller 1311, preview layout direction switching controller 1312 and scroll direction switching controller 1313, it is possible to easily change the layout direction and scrolling direction in the preview image in accordance with the position the user designates, in moving a document image (document page) or inserting a new document page when the user checks and edits the preview image on display panel 132.

Further, according to the present embodiment, since controller 131 in touch panel display 130, further includes finished state display controller 1317 and finishing process setup modification controller 1318, it is possible to easily change the finished settings for stapling, punching and/or page allocation etc., as well as changing the layout direction and scrolling direction in the preview image of the finished document state, in moving a document image or inserting a new document page in accordance with the user designated position when the user checks and edits the preview image on display panel 132.

The above embodiment was described taking examples in which control unit 120 is applied to image forming apparatus 100 shown in FIG. 1. However, as long as it is an image forming apparatus that includes a control unit capable of presenting document images in preview representation on a display panel or the like before printing so as to allow the user to check the printed state, the invention can be developed to any other image forming apparatus and the like, not limited to the image forming apparatus and copier having the configuration described above.

Further, though, in the above description, as a method for selecting/moving a document image displayed on touch panel display 130 or scrolling the preview image, a flick control with the user's finger is used to select and move a document image and to scroll the preview image, keys for scrolling, and give a move command, up, down, left and right may be displayed on touch panel display 130 so as to allow the user to touch these keys to give necessary control instructions.

Having described heretofore, the present invention is not limited to the above embodiment, various changes can be made within the scope of the appended claims. That is, it is apparent that various kinds of variations and modified examples will occur to those skilled in the art within the scope of the appended claims. That is, any embodied mode obtained by combination of technical means modified as appropriate without departing from the spirit and scope of the present invention should be included in the technical art of the present invention.

What is claimed is:

1. An image display operation device comprising:
    an operation screen displaying a document image in a preview representation; and,
    a display controller, characterized in that
    the display controller has a function of presenting a plurality of document images on the operation screen in the preview representation and a function of displaying the plurality of document images presented in the preview representation in a vertically or laterally scrolling manner,
    the display controller includes:
        a commanded position detecting controller that detects, when a user designates a position to be operated on the operation screen, the position designated by the user as a commanded position; and
        a switching controller that sets both of a layout direction and a scrolling direction in the plurality of document images presented in the preview representation in accordance with the commanded position detected by the commanded position detecting controller, and
    the commanded position is a position relative to a reference document image to be a reference among the plurality of document images presented in the preview representation.

2. The image display operation device according to claim 1, wherein the switching controller includes a setting function of setting the layout direction and the scrolling direction in the plurality of document images presented in the preview representation along a direction from the reference document image toward the commanded position detected by the commanded position detecting controller.

3. The image display operation device according to claim 1, wherein when the commanded position detecting controller detects the commanded position at the upper or lower side of the reference document image, the switching controller sets the layout direction and the scrolling direction in the plurality of document images presented in the preview representation in the vertical direction on the operation screen, when the commanded position detecting controller detects the commanded position at the left or right side of the reference document image, the switching controller sets the layout direction and the scrolling direction in the plurality of document images presented in the preview representation in the lateral direction on the operation screen.

4. The image display operation device according to claim 1, wherein the display controller includes a document image insertion controller that inserts a new document image into the commanded position detected by the commanded position detecting controller,
    the setting function of setting the layout direction and the scrolling direction in the plurality of document images presented in the preview representation along a direction in which the reference document image and the new document image inserted by the document image insertion controller are laid out.

5. The image display operation device according to claim 1, wherein the display controller includes a document image movement controller that moves a document image, displayed at the commanded position detected by the commanded position detecting controller, and selected from the plurality of document images,
    the switching controller includes a setting function of setting the layout direction and the scrolling direction in the plurality of document images presented in the preview representation along a direction in which the reference document image and the document image moved by the document image movement controller are laid out.

6. An image forming apparatus including an image display operation device, characterized in that the image display operation device according to claim 1 is used as the image display operation device.

7. An image display operation method comprising:
    a step of presenting a plurality of document images on an operation screen in a preview representation;
    a step of displaying the plurality of document images presented in the preview representation in a vertically or laterally scrolling manner;
    a commanded position detecting step of detecting, when a user designates a position to be operated on the operation screen, the position designated by the user as a commanded position; and
    a switching step of setting both of a layout direction and a scrolling direction in the plurality of document images presented in the preview representation in accordance with the commanded position detected by the commanded position detecting step, wherein
    the commanded position is a position relative to a reference document image to be a reference among the plurality of document images presented in the preview representation.

\* \* \* \* \*